(12) United States Patent
Sunohara et al.

(10) Patent No.: US 10,549,693 B2
(45) Date of Patent: Feb. 4, 2020

(54) BIRD'S-EYE VIEW VIDEO GENERATION DEVICE, BIRD'S-EYE VIEW VIDEO GENERATION SYSTEM, BIRD'S-EYE VIEW VIDEO GENERATION METHOD AND PROGRAM

(71) Applicant: JVC KENWOOD Corporation, Yokohama-shi, Kanagawa (JP)

(72) Inventors: Hitoshi Sunohara, Yokohama (JP); Fumio Tsukamoto, Yokohama (JP)

(73) Assignee: JVC KENWOOD Corporation, Yokohama-Shi (JP)

( * ) Notice: Subject to any disclaimer, the term of this patent is extended or adjusted under 35 U.S.C. 154(b) by 60 days.

(21) Appl. No.: 15/997,847

(22) Filed: Jun. 5, 2018

(65) Prior Publication Data
US 2018/0281681 A1    Oct. 4, 2018

Related U.S. Application Data

(63) Continuation of application No. PCT/JP2016/075021, filed on Aug. 26, 2016.

(30) Foreign Application Priority Data

Dec. 22, 2015  (JP) ................................. 2015-249905
Dec. 22, 2015  (JP) ................................. 2015-250426

(51) Int. Cl.
*B60R 1/00*      (2006.01)
*G06T 1/00*      (2006.01)

(52) U.S. Cl.
CPC .............. *B60R 1/00* (2013.01); *G06T 1/0007* (2013.01); *B60R 2300/105* (2013.01);
(Continued)

(58) Field of Classification Search
CPC ................................................. B60R 2300/607
(Continued)

(56) References Cited

U.S. PATENT DOCUMENTS

2007/0229310 A1* 10/2007 Sato ..................... B60W 50/14
340/995.1
2017/0066375 A1   3/2017 Kato

FOREIGN PATENT DOCUMENTS

JP          08-048198        2/1996
JP          10-257482        9/1998
(Continued)

OTHER PUBLICATIONS

International Search Report and Written Opinion for International Patent Application No. PCT/JP2016/075021 dated Nov. 15, 2016, 10 pages.

*Primary Examiner* — Jeffrey A Williams
(74) *Attorney, Agent, or Firm* — Amin, Turocy & Watson, LLP

(57) ABSTRACT

A bird's-eye view video generation device includes a video acquisition unit configured to acquire surroundings videos obtained by capturing videos of surroundings of a vehicle; a vehicle information acquisition unit configured to acquire vehicle information to estimate move of the vehicle in a turning direction; and a controller configured to, when move of the vehicle in the turning direction is estimated based on the vehicle information that is acquired by the vehicle information acquisition unit, generate a bird's-eye view video obtained by changing a position to display the bird's-eye view video containing a virtual vehicle image such that a surroundings video in a direction that has to be checked in the estimated turning direction is displayed widely. The generated bird's-eye view video is desolated by a display controller on a display panel.

8 Claims, 21 Drawing Sheets

(52) U.S. Cl.
CPC ... *B60R 2300/302* (2013.01); *B60R 2300/303* (2013.01); *B60R 2300/605* (2013.01); *B60R 2300/607* (2013.01); *B60R 2300/804* (2013.01); *B60R 2300/8086* (2013.01); *G06T 2207/20221* (2013.01)

(58) Field of Classification Search
USPC .......................................................... 348/148
See application file for complete search history.

(56) References Cited

FOREIGN PATENT DOCUMENTS

| | | |
|---|---|---|
| JP | 2008-148114 | 6/2008 |
| JP | 2010-079454 | 4/2010 |
| JP | 2012-071833 | 4/2012 |
| JP | 2014-004931 | 1/2014 |
| JP | 2014-103433 | 6/2014 |
| JP | 2015-076645 | 4/2015 |
| JP | 2015-220729 | 12/2015 |
| WO | 2015-159407 | 10/2015 |

* cited by examiner

BIRD'S-EYE VIEW VIDEO GENERATION DEVICE, BIRD'S-EYE VIEW VIDEO GENERATION SYSTEM, BIRD'S-EYE VIEW VIDEO GENERATION METHOD AND PROGRAM

CROSS-REFERENCE TO RELATED APPLICATION(S)

This application is a continuation of International Application No. PCT/JP2016/075021, filed on Aug. 26, 2016 which claims the benefit of priority of the prior Japanese Patent Application No. 2015-249905, filed on Dec. 22, 2015 and Japanese Patent Application No. 2015-250426, filed on Dec. 22, 2015, the entire contents of which are incorporated herein by reference.

BACKGROUND

1. Technical Field

The present disclosure relates to a bird's-eye view video generation device, a bird's-eye view video generation system, a bird's-eye view video generation method and a program.

2. Description of the Related Art

A technology of displaying a bird's-eye view video of a vehicle together with an image of the vehicle is known (see, for example, Japanese Laid-open Patent Publication No. 2015-076645 and Japanese Laid-open Patent Publication No. 2012-071833). The technology according to Japanese Laid-open Patent Publication No. 2015-076645 increases a display area of the bird's-eye view video in the rear of the vehicle image when the vehicle switches from going forward to reversing. The technology according to Japanese Laid-open Patent Publication No. 2012-071833 automatically switches the display to a video of an area containing a part of a vehicle with a high risk of contact during travel of a narrow path or a narrow curved path for drive support during travel of the vehicle.

When turning a vehicle, a driver of the vehicle checks surroundings of the vehicle containing the rear of the vehicle by checking with side mirrors and a rearview mirror and checking by sight. With the side mirrors and the rearview mirror, however, it may be difficult to check by sight an area where information to note is displayed, that is, a direction that have to be checked, when the vehicle is turned. Thus, a technology that makes it possible to check surroundings of a vehicle when turning the vehicle is being desired.

SUMMARY

It is an object of the present disclosure to at least partially solve the problems in the conventional technology.

A bird's-eye view video generation device according to one aspect includes a video acquisition unit configured to acquire surroundings videos obtained by capturing videos of surroundings of a vehicle, a vehicle information acquisition unit configured to acquire a speed of the vehicle and vehicle information to estimate move of the vehicle in a turning direction, and a controller configured to generate, based on the surroundings videos acquired by the video acquisition unit, a bird's-eye view video of the vehicle looked down from above, the bird's-eye view video containing a virtual vehicle image representing the vehicle. The controller is configured to, when move of the vehicle in the turning direction is estimated based on the vehicle information that is acquired by the vehicle information acquisition unit, generate a bird's-eye view video in which the vehicle is moved to and positioned on a side opposite to a direction in which the vehicle moves in the turning direction with a surroundings video in a direction in which the vehicle moves being widely displayed in a different direction in a situation where the vehicle is decelerating and a situation where the vehicle is accelerating.

A bird's-eye view video generation system according to one aspect includes the bird's-eye view video generation device described above, and at least either an imaging unit configured to capture surroundings videos obtained by capturing videos of surroundings of the vehicle and supply the surroundings videos to the video acquisition unit or a display controller and a display panel that display a bird's-eye view video that is generated by the controller.

A bird's-eye view video generation method according to one aspect includes steps of: (a) acquiring surroundings videos obtained by capturing videos of surroundings of a vehicle, (b) acquiring a speed of the vehicle and vehicle information to estimate move of the vehicle in a turning direction, and (c) controlling to generate, based on the surroundings videos acquired at the step (a), a bird's-eye view video of the vehicle looked down from above, the bird's-eye view video containing a virtual vehicle image representing the vehicle. The step (c) includes generating, when move of the vehicle in the turning direction is estimated based on the vehicle information that is acquired at the step (b), a bird's-eye view video in which the vehicle is moved to and positioned on a side opposite to a direction in which the vehicle moves in the turning direction with a surroundings video in a direction in which the vehicle moves being widely displayed in a different direction in a situation where the vehicle is decelerating and a situation where the vehicle is accelerating.

A non-transitory storage medium storing therein a program is disclosed. The program according to one aspect causes a computer to execute, as a bird's-eye view video generation device, a process comprising steps of: (a) acquiring surroundings videos obtained by capturing videos of surroundings of a vehicle, (b) acquiring a speed of the vehicle and vehicle information to estimate move of the vehicle in a turning direction, and (c) controlling to generate, based on the surroundings videos acquired at the step (a), a bird's-eye view video of the vehicle looked down from above, the bird's-eye view video containing a virtual vehicle image representing the vehicle. The step (c) includes generating, when move of the vehicle in the turning direction is estimated based on the vehicle information that is acquired at the step (b), a bird's-eye view video in which the vehicle is moved to and positioned on a side opposite to a direction in which the vehicle moves in the turning direction with a surroundings video in a direction in which the vehicle moves being widely displayed in a different direction in a situation where the vehicle is decelerating and a situation where the vehicle is accelerating.

The above and other objects, features, advantages and technical and industrial significance of this disclosure will be better understood by reading the following detailed description of presently preferred embodiments of the disclosure, when considered in connection with the accompanying drawings.

DETAILED DESCRIPTION

With reference to the accompanying drawings, embodiments of a bird's-eye view video generation device 40, a bird's-eye view video generation system 1, a bird's-eye view video generation method and a program according to the present invention will be described in detail below. The following embodiments do not limit the invention.

First Embodiment

Figure 1:
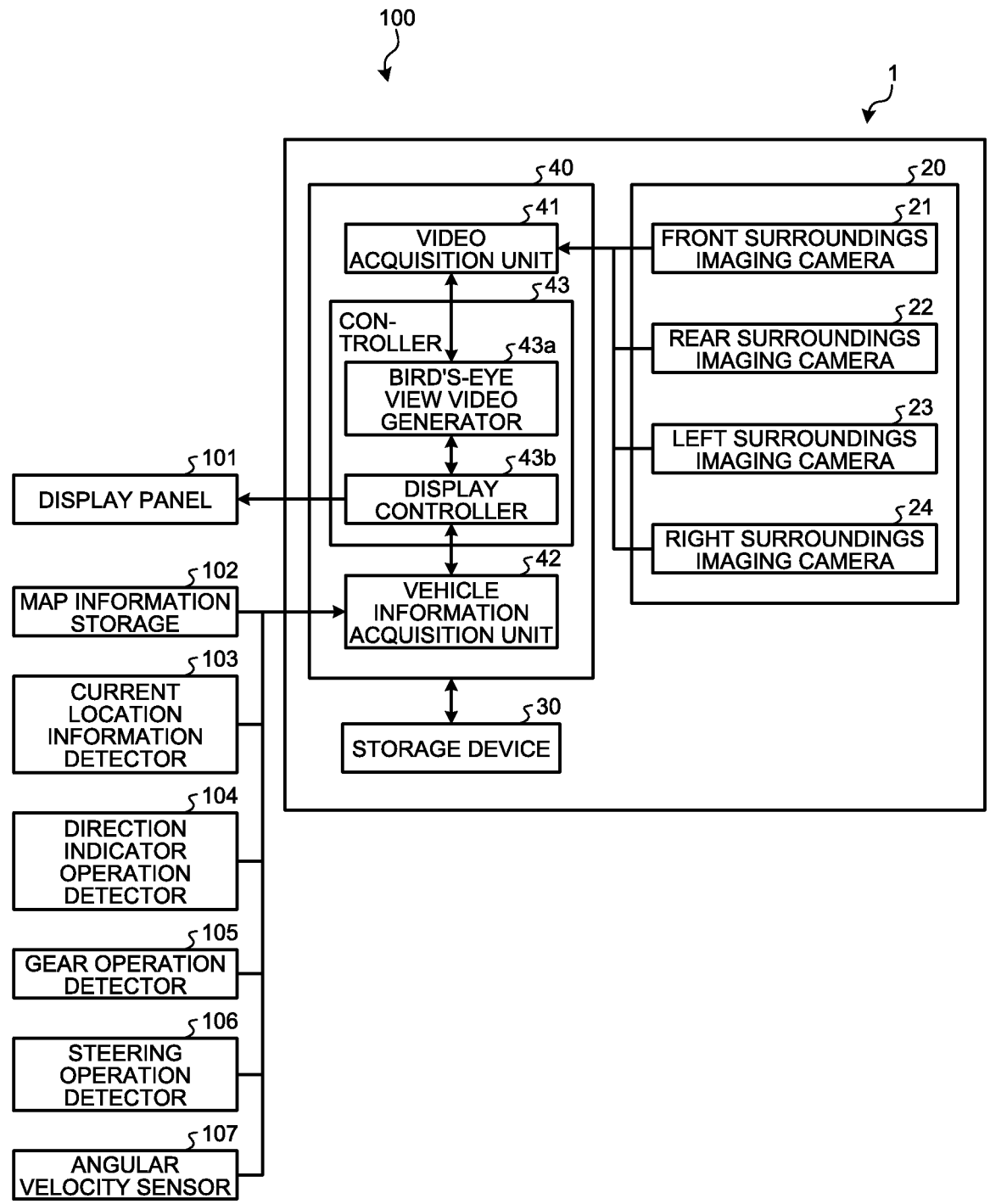
FIG. 1 is a block diagram illustrating an exemplary configuration of a bird's-eye view video generation system according to a first embodiment.

FIG. 1 is a block diagram illustrating an exemplary configuration of a bird's-eye view video generation system according to a first embodiment. The bird's-eye view video generation system 1 generates a bird's-eye view video B (see FIG. 3) of a vehicle 100.

First of all, the vehicle 100 will be described. As illustrated in FIG. 1, the vehicle 100 includes the bird's-eye view video generation system 1, a display panel 101, a map information storage 102, a current location information detector 103, a direction indicator operation detector 104, a gear operation detector 105, a steering operation detector 106 and an angular velocity sensor 107. In the first embodiment, the bird's-eye view video generation system 1 does not include the display panel 101, the map information storage 102, the current location information detector 103, the direction indicator operation detector 104, the gear operation detector 105, the steering operation detector 106 and the angular velocity sensor 107. Alternatively, the bird's-eye view video generation system 1 may include those components. The bird's-eye view video generation system 1 may be a device that is portable and usable in a vehicle other than one mounted on the vehicle 100.

The display panel 101 is, for example, a display that includes a liquid crystal display (LED) or an organic electroluminescence (EL) display. The display panel 101 displays a bird's-eye view video based on video signals that are output from the bird's-eye view video generation device 40 of the bird's-eye view video generation system 1. The display panel 101 may be one dedicated to the bird's-eye view video generation system 1. For example, the display panel 101 may be shared with other systems including a navigation system. The display panel 101 is arranged in a position easily viewable by a driver.

The map information storage 102 stores map information. The map information is, for example, a roadmap containing intersections. The map information may contain lane information about a road with multiple lanes. The map information may contain information about a route guide to a destination. The route guide information may contain, for example, information to turn right or left at intersections and information to change the lane near an intersection of a road with multiple lanes. The map information storage 102 outputs the stored map information to a vehicle information acquisition unit 42 of the bird's-eye view video generation device 40 of the bird's-eye view video generation system 1.

The current location information detector 103 detects the current location of the vehicle 100. The current location information detector 103 is, for example, a global positioning system (GPS) receiver. The current location information detector 103 outputs acquired current location information about the vehicle 100 to the vehicle information acquisition unit 42 of the bird's-eye view video generation device 40 of the bird's-eye view video generation system 1.

The direction indicator operation detector 104 detects an operation on a direction indicator. More specifically, the direction indicator operation detector 104, for example, detects an operation on a switch to operate the direction indicator as direction indicator operation information. The direction indicator operation detector 104 outputs the detected direction indicator operation information to the vehicle information acquisition unit 42 of the bird's-eye view video generation device 40 of the bird's-eye view video generation system 1.

The gear operation detector 105 detects an operation on gears. More specifically, the gear operation detector 105 detects an operation of selecting a gear as gear operation information. The gear operation detector 105 outputs the detected gear operation information to the vehicle information acquisition unit 42 of the bird's-eye view video generation device 40 of the bird's-eye view video generation system 1.

The steering operation detector 106 detects an operation on a steering wheel. More specifically, the steering operation detector 106 detects an operational angle on the steering wheel as steering operation information. The steering operation detector 106 outputs the detected steering operation information to the vehicle information acquisition unit 42 of the bird's-eye view video generation device 40 of the bird's-eye view video generation system 1.

The angular velocity sensor 107 detects an angular velocity of the vehicle 100. The angular velocity sensor 107 is, for example, a gyro sensor. The angular velocity sensor 107 outputs the detected angular velocity to the vehicle information acquisition unit 42 of the bird's-eye view video generation device 40 of the bird's-eye view video generation system 1.

The bird's-eye view video generation system 1 includes a first imaging device 20, a storage device 30 and the bird's-eye view video generation device 40.

The first imaging device 20 captures videos of surroundings of the vehicle 100. The first imaging device 20 includes a front surroundings imaging camera 21, a rear surroundings imaging camera 22, a left surroundings imaging camera 23 and a right surroundings imaging camera 24. The first imaging device 20 captures omnidirectional videos of the vehicle 100 with the front surroundings imaging camera 21, the rear surroundings imaging camera 22, the left surroundings imaging camera 23 and the right surroundings imaging camera 24. The first imaging device 20 outputs the videos captured with the front surroundings imaging camera 21, the rear surroundings imaging camera 22, the left surroundings imaging camera 23 and the right surroundings imaging camera 24 to a video acquisition unit 41 of the bird's-eye view video generation device 40.

The front surroundings imaging camera 21 is arranged on the front of the vehicle 100 and captures a video of surroundings of the front of the vehicle 100. The front surroundings imaging camera 21 outputs the captured video to the video acquisition unit 41 of the bird's-eye view video generation device 40.

The rear surroundings imaging camera 22 is arranged on the rear of the vehicle 100 and captures a video of the surroundings of the rear of the vehicle 100. The rear surroundings imaging camera 22 outputs the captured video to the video acquisition unit 41 of the bird's-eye view video generation device 40.

The left surroundings imaging camera 23 is arranged on the left side of the vehicle 100 and captures a video of the surroundings of the left side of the vehicle 100. The left surroundings imaging camera 23 outputs the captured video to the video acquisition unit 41 of the bird's-eye view video generation device 40.

The right surroundings imaging camera 24 is arranged on the right side of the vehicle 100 and captures a video of the surroundings of the right side of the vehicle 100. The right surroundings imaging camera 24 outputs the captured video to the video acquisition unit 41 of the bird's-eye view video generation device 40.

The storage device 30 stores data necessary for various types of processing performed by the bird's-eye view video generation device 40 and results of the various types of processing. The storage device 30 is, for example, a semiconductor memory device, such as a random access memory (RAM), a read only memory (ROM) or a flash memory, or a storage device, such as a hard disk device or an optical disk.

The bird's-eye view video generation device 40 is, for example, an arithmetic processing unit consisting of, for example, a central processing unit (CPU). The bird's-eye view video generation device 40 loads a program that is stored in the storage device 30 into a memory and executes commands contained in the program. The bird's-eye view video generation device 40 includes the video acquisition unit 41, the vehicle information acquisition unit 42 and a controller 43 that includes a bird's-eye view video generator 43a and a display controller 43b.

The video acquisition unit 41 acquires surroundings videos obtained by capturing videos of the surroundings of the vehicle 100. More specifically, the video acquisition unit 41 acquires the videos that are output by the front surroundings imaging camera 21, the rear surroundings imaging camera 22, the left surroundings imaging camera 23 and the right surroundings imaging camera 24 of the first imaging device 20. The video acquisition unit 41 outputs the acquired videos to the bird's-eye view video generator 43a.

The vehicle information acquisition unit 42 acquires vehicle information to estimate move of the vehicle 100 in a turning direction in which the vehicle 100 turns. The information to estimate move of the vehicle in the turning direction is vehicle information that is at least any one of map information about the surroundings of the vehicle 100, the current location information about the vehicle 100, direction indicator operation information about the vehicle 100, gear operation information about the vehicle 100, steering operation information about the vehicle 100, and an angular velocity of the vehicle 100, etc. More specifically, the vehicle information acquisition unit 42 acquires the vehicle information that is output by any one of the map information storage 102, the current location information detector 103, the direction indicator operation detector 104, the gear operation detector 105, the steering operation detector 106 and the angular velocity sensor 107. The vehicle information acquisition unit 42 outputs the acquired vehicle information to the display controller 43b.

The controller 43 includes the bird's-eye view video generator 43a that performs viewpoint conversion on a virtual vehicle image A of the vehicle 100 viewed from above and videos, which are obtained by the video acquisition unit 41, to obtain a video of the vehicle 100 viewed from above to generate a bird's-eye view video B; and the display controller 43b that processes the video that is generated by the bird's-eye view video generator 43a and transmits the video to the display panel 101. For example, the controller 43 processes, with the display controller 43b, the bird's-eye view video B, which is generated by the bird's-eye view video generator 43a, such that the bird's-eye view video B is displayed on the display panel 101 with the virtual vehicle image A moved on a side and then transmits the processed bird's-eye view video B to the display panel 101. The controller 43 processes, with the display controller 43b, the bird's-eye view video B, which is generated by the bird's-eye view video generator 43a, such that the bird's-eye view video B is displayed on the display panel 101 with the virtual vehicle image A moved on a side and reduced and transmits the processed bird's-eye view video B to the display panel 101.

The bird's-eye view video generator 43a generates the bird's-eye view video B based on the videos that are captured by the front surroundings imaging camera 21, the rear surroundings imaging camera 22, the left surroundings imaging camera 23 and the right surroundings imaging camera 24. Any known method may be used for a method of generating the bird's-eye view video B and the method is not limited. The bird's-eye view video B includes at least any one of the virtual vehicle image A, a front video B1, a rear video B2, a left video B3 and a right video B4. The bird's-eye view video B is generated within a rectangular frame F. The frame F includes at least any one of a first frame F1 to display the front video B1, a second frame F2 to display the rear video B2, a third frame F3 to display the left video B3, and a fourth frame F4 to display the right video B4. The bird's-eye view video generator 43a outputs the generated bird's-eye view video B to the display controller 43b.

When move of the vehicle 100 in the turning direction (left or right direction) is estimated based on the vehicle information that is acquired by the vehicle information acquisition unit 42, the display controller 43b generates the bird's-eye view video B obtained by changing the position to display the bird's-eye view video B containing the virtual vehicle image A such that an area in which information to note in the estimated turning direction, that is, a surroundings video in a direction that has to be checked, is displayed wider. When move of the vehicle 100 in the turning direction (left or right direction) is estimated based on the vehicle information that is acquired by the vehicle information acquisition unit 42, the display controller 43b generates the bird's-eye view video B containing the virtual vehicle image A of the vehicle 100 that is looked down from above and that is moved to and positioned on a side opposite to the direction in which the vehicle 100 moves in the turning direction. Move of the vehicle 100 in the turning direction is move in a direction deviating from a direction in which a road on which the vehicle 100 is traveling (referred to as a "travel road direction" below). Move in the turning direction is move in the left or right direction with respect to the front in the front and rear directions of the vehicle 100. For example, when turning right or left or changing the lane, the vehicle 100 moves in the turning direction. Move of the vehicle 100 in the turning direction does not contain move of the vehicle 100 along a bent or curved road. The display controller 43b may determine that it is move in a deviating direction when the deviation from the travel road direction is 15 degrees or more. This is not to determine some vibrations during travel and the backlash of the steering wheel as move of the vehicle 100 in the turning direction.

Figure 2:
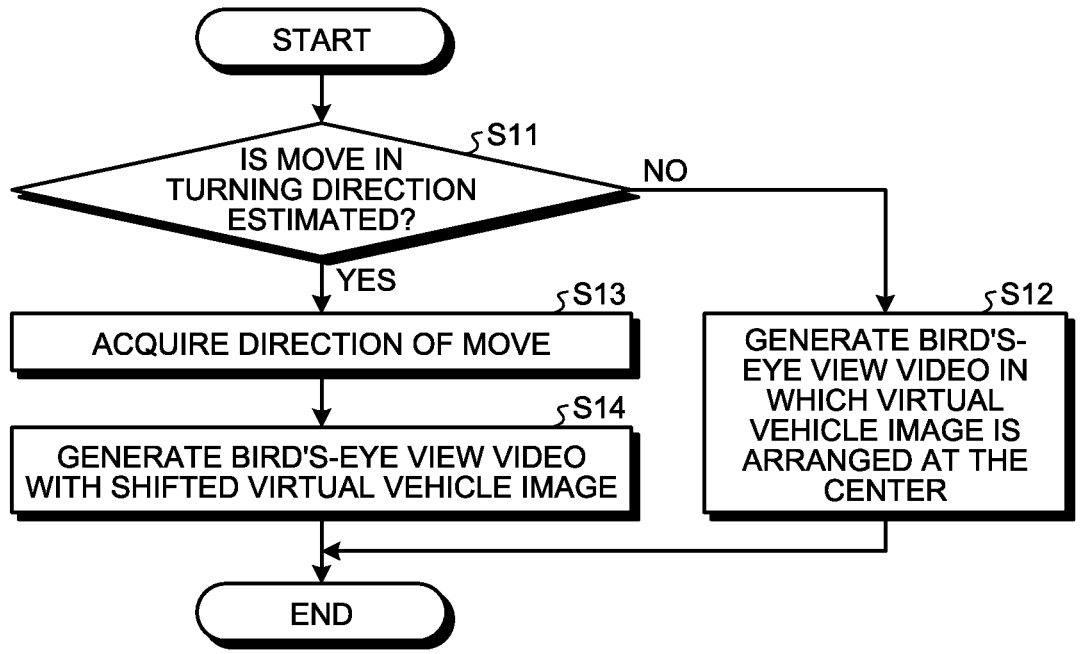
FIG. 2 is a flowchart illustrating a flow of processes performed by a bird's-eye view video generation device of the bird's-eye view video generation system according to the first embodiment.

With reference to FIG. 2, a flow of the processes performed by the bird's-eye view video generation device 40 of the bird's-eye view video generation system 1 will be described. FIG. 2 is a flowchart illustrating the flow of the processes performed by the bird's-eye view video generation device of the bird's-eye view video generation system according to the first embodiment.

The display controller 43b determines whether move in the turning direction is estimated (step S11). More specifically, the display controller 43b determines whether move of the vehicle 100 in the turning direction is estimated based on the vehicle information that is at least any one of the map information about the surroundings of the vehicle 100, the current location information about the vehicle 100, the direction indicator operation information about the vehicle 100, the gear operation information about the vehicle 100, the steering operation information about the vehicle 100, and the angular velocity of the vehicle 100 that are acquired by the vehicle information acquisition unit 42.

A case where the display controller 43b determines whether move of the vehicle 100 in the turning direction is estimated based on the map information about the surroundings of the vehicle 100 and the current location information about the vehicle 100, which are acquired by the vehicle information acquisition unit 42, will be described. For example, the display controller 43b determines that move of the vehicle 100 in the turning direction is estimated based on the map information about the surroundings of the vehicle 100 and the current location information about the vehicle 100 when the vehicle 100 gets close to an intersection where the vehicle 100 is supposed to turn right or left according to the route guide information and is going to be within a given distance from the intersection. The given distance may be, for example, five meters. For example, the display controller 43b determines that move of the vehicle 100 in the turning direction is estimated based on the map information about the surroundings of the vehicle 100 and the current location information about the vehicle 100 when the vehicle 100 gets close to a location where the vehicle 100 is supposed to change the lane according to the route guide information and is going to be within a given distance from the location. The given distance may be, for example, five meters. When it is determined that move of the vehicle 100 in the turning direction is estimated, the display controller 43*b* may store the estimated direction in which the vehicle 100 moves in the storage device 30.

A case where the display controller 43*b* determines whether move of the vehicle 100 in the turning direction is estimated based on the direction indicator operation information, which is acquired by the vehicle information acquisition unit 42, will be described. For example, the display controller 43*b* determines that move of the vehicle 100 in the turning direction is estimated based on the direction indicator operation information when the direction indicator is operated. When it is determined that move of the vehicle 100 in the turning direction is estimated, the display controller 43*b* stores the estimated direction in which the vehicle 100 moves in the storage device 30.

A case where the display controller 43*b* determines whether move of the vehicle 100 in the turning direction is estimated based on the gear operation information and the steering operation information, which are acquired by the vehicle information acquisition unit 42, will be described. For example, the display controller 43*b* determines that move of the vehicle 100 in the turning direction is estimated based on at least any one of the gear operation information and the steering operation information when the steering wheel is operated or when the reverse gear is selected and the steering wheel is operated. When the display controller 43*b* determines that move of the vehicle 100 in the turning direction is estimated, the display controller 43*b* stores the estimated direction in which the vehicle 100 moves in the storage device 30.

A case where the display controller 43*b* determines whether move of the vehicle 100 in the turning direction is estimated based on the map information about the surroundings of the vehicle 100, the current location information about the vehicle 100 and at least any one of the steering operation information and the angular velocity of the vehicle 100, which are acquired by the vehicle information acquisition unit 42, will be described. For example, the display controller 43*b* determines that move of the vehicle 100 in the turning direction is estimated based on the map information about the surroundings of the vehicle 100, the current location information about the vehicle 100 and at least any one of the steering operation information and the angular velocity of the vehicle 100 when a steering operation in a direction deviating from the travel road direction is performed or when the angular velocity changes to a direction deviating from the travel road direction. For example, move in a deviating direction may be determined when the deviation from the travel road direction is equal to or larger than 15 degrees.

Determination is made based on a combination of the map information about the surroundings of the vehicle 100, the current location information about the vehicle 100 and at least any one of the steering operation information and the angular velocity of the vehicle 100 not to erroneously determine that move of the vehicle 100 in the turning direction is estimated, for example, when a steering operation is performed or the angular velocity changes along a bent or curved road. When it is determined that move of the vehicle 100 is estimated, the display controller 43*b* stores the estimated direction in which the vehicle 100 moves in the storage device 30.

A case where the display controller 43*b* determines whether move of the vehicle 100 in the turning direction is estimated based on the map information about the surroundings of the vehicle 100, the current location information about the vehicle 100 and at least any one of the direction indicator operation information, the steering operation information and the angular velocity of the vehicle 100, which are acquired by the vehicle information acquisition unit 42, will be described. For example, the display controller 43*b* determines that move of the vehicle 100 in the turning direction is estimated based on the map information about the surroundings of the vehicle 100, the current location information about the vehicle 100 and at least any one of the direction indicator operation information, the steering operation information and the angular velocity of the vehicle 100 when the vehicle 100 gets close to an intersection where the vehicle 100 is supposed to turn right or left according to the route guide information and is going to be within a given distance from the intersection and when the direction indicator is operated, or when a steering operation is performed in a direction deviating from the travel road direction, or when the angular velocity changes to a direction deviating from the travel road direction. The given distance may be, for example, give meters. When the deviation from the travel road direction is equal to or larger than 15 degrees, move in a deviating direction may be determined. For example, the display controller 43*b* determines that move of the vehicle 100 in the turning direction is estimated based on the map information about the surroundings of the vehicle 100, the current location information about the vehicle 100 and at least any one of the direction indicator operation information, the steering operation information and the angular velocity of the vehicle 100 when the vehicle 100 gets close to a location where the vehicle 100 is supposed to turn right or left according to the route guide information and is going to be within a given distance from the intersection and when the direction indicator is operated, or when a steering operation is performed in a direction deviating from the travel road direction, or when the angular velocity changes to a direction deviating from the travel road direction. The given distance may be, for example, five meters. For example, when the deviation from the travel road direction is equal to or larger than 15 degrees, move in the deviating direction may be determined. Determination is made based on a combination of the map information about the surroundings of the vehicle 100, the current location information about the vehicle 100 and at least any one of the direction indicator operation information, the steering operation information and the angular velocity of the vehicle 100 not to erroneously estimate that the vehicle 100 will move in the turning direction, for example, when the driver does not follow the route guide and goes straight although turning right or left or changing the lane is indicated by the route guide. When it is determined that move of the vehicle 100 in the turning direction is estimated, the display controller 43*b* stores the estimated direction in which the vehicle 100 moves in the storage device 30.

When move of the vehicle 100 in the turning direction is not estimated (NO at step S11), the display controller 43*b* proceeds to step S12.

When it is estimated that the vehicle 100 will move in the turning direction (YES at step S11), the display controller 43*b* proceeds to step S13.

The display controller 43b generates the normal bird's-eye view video B in which the virtual vehicle image A is positioned at the center (step S12). More specifically, the display controller 43b generates the bird's-eye view video B containing the virtual vehicle image A of the vehicle 100 looked down from above in a state of being positioned at the center. In the bird's-eye view video B, the center C of the virtual vehicle image A is positioned at the center of the frame F.

The display controller 43b acquires a direction in which the vehicle 100 moves (step S13). The display controller 43b acquires the direction in which the vehicle 100 moves and that is stored in the storage device 30 at step S11.

The display controller 43b generates the bird's-eye view video B that is displayed on the display panel 101 with the virtual vehicle image A shifted (step S14). More specifically, the display controller 43b generates the bird's-eye view video B containing the virtual vehicle image A of the vehicle 100 looked down from above and that is moved to and positioned on the side opposite to the direction in which the vehicle 100 moves in the turning direction. In the embodiment, the display controller 43b generates the bird's-eye view video B containing the virtual vehicle image A of the vehicle 100 that is looked down from above and that is moved and positioned on a side opposite to the direction in which the vehicle 100 moves in the turning direction and on an upper side of the frame F.

More specifically, first of all, the display controller 43b determines in which one of the left and right directions with respect to the travel road direction the direction in which the vehicle 100 moves is positioned. When it is determined that the direction in which the vehicle 100 moves is the right direction, the display controller 43b positions the virtual vehicle image A at the upper left of the frame F in the bird's-eye view image B. In this case, a center line LA of the virtual vehicle image A is positioned on the left side with respect to a center line LF of the frame F. The center C of the virtual vehicle image A is positioned on the upper side of the frame F. When it is determined that the direction in which the vehicle 100 moves is the left direction, the display controller 43b positions the virtual vehicle image A at the upper right of the frame F in the bird's-eye view video B. In this case, the center Line LA of the virtual vehicle image A is positioned on the right side with respect to the center line LF of the frame F. The center line C of the virtual vehicle image A is positioned on the upper side of the frame F. The display controller 43b generates the bird's-eye view video B in which the virtual vehicle image A is positioned at the upper left or the upper right of the frame F. Accordingly, when the virtual vehicle image A is positioned at the upper left of the frame F, the right side with respect to the virtual vehicle image A is displayed widely in the bird's-eye view video B. When the virtual vehicle image A is positioned at the upper right of the frame F, the left side with respect to the virtual vehicle image A is displayed widely. As the virtual vehicle image A represents the vehicle 100, it is possible to widely display the area in which information to note around the vehicle 100 when the vehicle 100 is moved in the turning direction is displayed.

Figure 3:
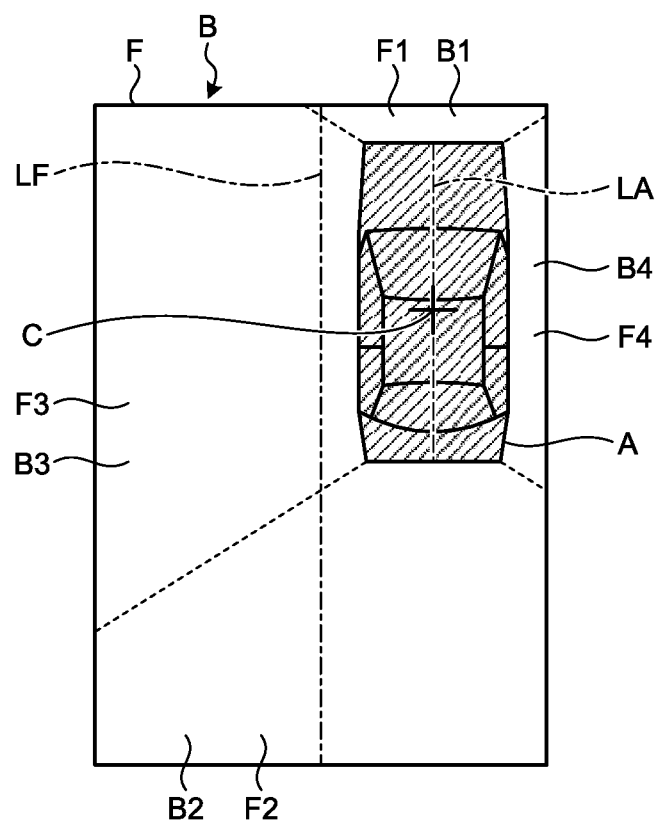
FIG. 3 is a diagram illustrating a bird's-eye view video that is generated by the bird's-eye view video generation system according to the first embodiment.

In the embodiment, the direction in which the vehicle 100 moves is the left direction and, as illustrated in FIG. 3, the virtual vehicle image A is positioned at the upper right of the frame F in the bird's-eye view video B. FIG. 3 is a diagram illustrating a bird's-eye view video that is generated by the bird's-eye view video generation system according to the first embodiment. The bird's-eye view video B contains the virtual vehicle image A, the rear video B2 and the left video B3 each in a wide area, and the front video B1 and the right video B4 each in a narrow area. The frame F contains the second frame F2 and the third frame F3 widely and contains the first frame F1 and the fourth frame F4 narrowly. Thus, the left side corresponding to the direction in which the vehicle 100 moves is displayed widely in the bird's-eye view video B.

When move of the vehicle 100 in the turning direction completes, the display controller 43b generates the bird's-eye view video B in which the virtual vehicle image A recovers to the original state.

The case where the display controller 43b estimates move of the vehicle 100 in the turning direction based on the map information about the surroundings of the vehicle 100 and the current location information about the vehicle 100, which are acquired by the vehicle information acquisition unit 42, will be described. For example, the display controller 43b determines that move of the vehicle 100 in the turning direction completes based on the map information about the surroundings of the vehicle 100 and the current location information about the vehicle 100 when the vehicle 100 is distant from the intersection where the vehicle 100 is supposed to turn right or left according to the route guide information by a given distance or larger. The given distance may be, for example, five meters. For example, the display controller 43b determines that move of the vehicle 100 in the turning direction completes based on the map information about the surroundings of the vehicle 100 and the current location information about the vehicle 100 when the vehicle 100 is distant from the location where the vehicle 100 is supposed to change the lane according to the route guide information by a given distance or larger.

The case where the display controller 43b estimates move of the vehicle 100 in the turning direction based on the direction indicator operation information that is acquired by the vehicle information acquisition unit 42 will be described. For example, the display controller 43b determines that move of the vehicle 100 in the turning direction completes based on the direction indicator operation information when the operation on the direction indicator is canceled.

The case where the display controller 43b estimates move of the vehicle 100 in the turning direction based on the gear operation information and the steering operation information that are acquired by the vehicle information acquisition unit 42 will be described. For example, the display controller 43b determines that move of the vehicle 100 in the turning direction completes based on at least any one of the gear operation information and the steering operation information when the steering wheel is operated in a recovering direction or when selecting the reverse gear is canceled and the steering wheel is operated in the recovering direction.

The case where the display controller 43b estimates move of the vehicle 100 in the turning direction based on the map information about the surroundings of the vehicle 100, the current location information about the vehicle 100, and at least any one of the steering operation information and the angular velocity of the vehicle 100, which are acquired by the vehicle information acquisition unit 42, will be described. For example, the display controller 43b determines that move of the vehicle 100 in the turning direction completes based on the map information about the surroundings of the vehicle 100, the current location information about the vehicle 100, and at least any one of the steering operation information and the angular velocity of the vehicle 100 when the steering wheel is operated in the recovering direction or when the angular velocity changes to the recovering direction.

The case where the display controller 43b estimates move of the vehicle 100 in the turning direction based on the map information about the surroundings of the vehicle 100, the current location information about the vehicle 100, and at least any one of the direction indicator operation information, the steering operation information and the angular velocity of the vehicle 100, which are acquired by the vehicle information acquisition unit 42, will be described. For example, the display controller 43b determines that move of the vehicle 100 in the turning direction completes based on the map information about the surroundings of the vehicle 100, the current location information about the vehicle 100, and at least any one of the direction indicator operation information, the steering operation information and the angular velocity of the vehicle 100 when the vehicle 100 is distant from the intersection where the vehicle 100 is supposed to turn right or left according to the route guide information by a given distance or larger and when the operation on the direction indicator is canceled, or when the steering wheel is operated in the recovering direction, or when the angular velocity changes to a recovering direction. The given distance may be, for example, five meters. For example, the display controller 43b determines that move of the vehicle 100 in the turning direction completes based on the map information about the surroundings of the vehicle 100, the current location information about the vehicle 100, and at least any one of the direction indicator operation information, the steering operation information and the angular velocity of the vehicle 100 when the vehicle 100 is distant from the location where the vehicle 100 is supposed to change the lane according to the route guide information by a given distance or larger and when the operation on the direction indicator is canceled, or when the steering wheel is operated in the recovering direction, or when the angular velocity changes to a recovering direction. The given distance may be, for example, five meters.

In such a case, the display controller 43b determines that move of the vehicle 100 in the turning direction completes and generates the bird's-eye view video B in which the virtual vehicle image A recovers to the original state.

In the above-described manner, the bird's-eye view video generation system 1 generates the bird's-eye view video B and outputs video singles to the display panel 101 outside the bird's-eye view video generation system 1. The external display panel 101, for example, displays the bird's-eye view video B together with a navigation screen based on the video signals that are output from the bird's-eye view video generation system 1.

As described above, the bird's-eye view video generation system 1 according to the first embodiment is able to generate the bird's-eye view video B containing the virtual vehicle image A of the vehicle 100 that is looked down from above and that is moved to and positioned on a side opposite to the direction in which the vehicle 100 moves in the turning direction when move of the vehicle 100 in the turning direction is estimated based on the vehicle information that is acquired by the vehicle information acquisition unit 42. Accordingly, for example, when the direction in which the vehicle 100 moves is the left direction, the left side corresponding to the direction in which the vehicle 100 moves can be displayed widely in the the bird's-eye view video B. For example, when the direction in which the vehicle 100 moves is the right direction, the right side corresponding to the direction in which the vehicle 100 moves can be displayed widely tin the bird's-eye view video B. Accordingly, the direction in which the vehicle 100 moves can be displayed widely in the bird's-eye view video B. Thus, the bird's-eye view video generation system 1 makes it possible to properly check information about the surroundings of the vehicle 100, more specifically, information to note when moving the vehicle 100 in the turning direction, according to move of the vehicle 100 in the turning direction.

Second Embodiment

Figure 4:
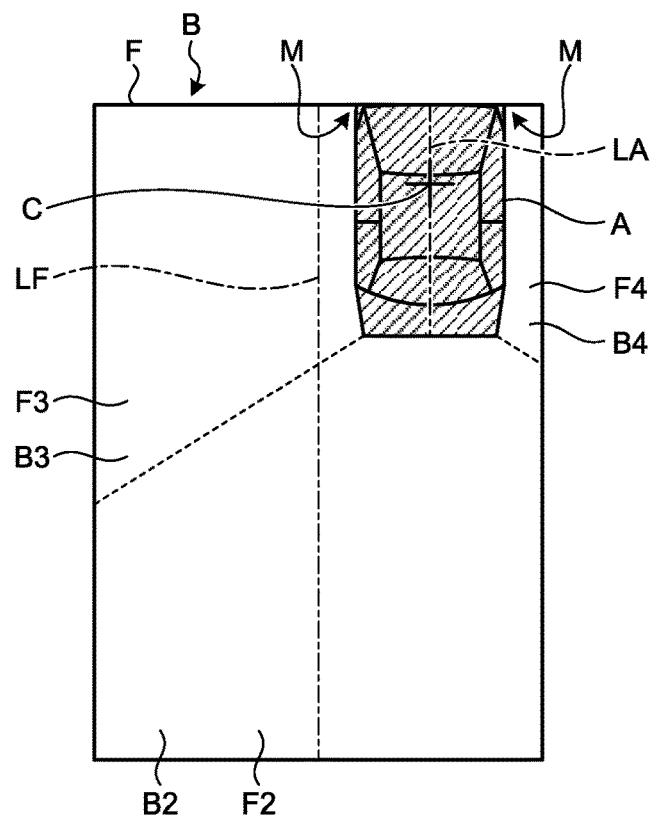
FIG. 4 is a diagram illustrating another exemplary bird's-eye view video that is generated by a bird's-eye view video generation system according to a second embodiment.

With reference to FIG. 4, the bird's-eye view video generation system 1 according to a second embodiment will be described. FIG. 4 is a diagram illustrating another exemplary bird's-eye view video that is generated by a bird's-eye view video generation system according to the second embodiment. A basic configuration of the bird's-eye view video generation system 1 is the same as that of the bird's-eye view video generation system 1 according to the first embodiment. In the following descriptions, the same components as those of the bird's-eye view video generation system 1 will be denoted with the same reference numbers or corresponding reference numbers and detailed descriptions of the components will be omitted. The bird's-eye view video generation system 1 of the second embodiment is different from the bird's-eye view video generation system 1 of the first embodiment in processes performed by the bird's-eye view video generation device 40.

When generating the bird's-eye view video B in which the virtual vehicle image A is shifted at step S14 in the flowchart represented in FIG. 2, the display controller 43b generates the bird's-eye view video B of the rear of the side mirrors M of the vehicle 100. More specifically, when positioning the virtual vehicle image A at the upper left or the upper right of the frame F in the bird's-eye view video B, the display controller 43b positions the virtual vehicle image A in a position where the rear of the side mirrors M of the vehicle 100 is within the frame F.

In the second embodiment, the moving direction of the vehicle 100 is the left direction and, as illustrated in FIG. 4, the virtual vehicle image A is positioned at the upper right of the frame F in a position where the rear of the side mirrors M of the vehicle 100 is within the frame F in the bird's-eye view video B. The bird's-eye view video B contains the rear of the side mirrors M of the virtual vehicle image A, the rear video B2 and the left video B3 each in a wide area and the right video B4 in a narrow area. The frame F contains the second frame F2 and the third frame F3 widely, contains the fourth frame F4 narrowly, and does not contain the first frame F1. Thus, the left side corresponding to the direction in which the vehicle 100 moves and the rear are displayed widely in the bird's-eye view video B.

As described above, the bird's-eye view video generation system 1 according to the second embodiment is able to generate the bird's-eye view video B of the rear of the side mirrors M of the vehicle 100. Accordingly, the bird's-eye view video generation system 1 is able to display the direction in which the vehicle 100 moves and the rear widely. Such display leads to matching between a start point of an area viewable with the side mirror M and a start point of an area that is displayed as the bird's-eye view video B and accordingly the area viewable with the side mirror M and the positional relationship of the bird's-eye view video B with a blind area are understood easily. Thus, the bird's-eye view video generation system 1 makes it possible to properly check information about the surroundings of the vehicle 100, more specifically, information to note when moving the vehicle 100 in the turning direction, according to move of the vehicle in the turning direction.

Third Embodiment

Figure 5:
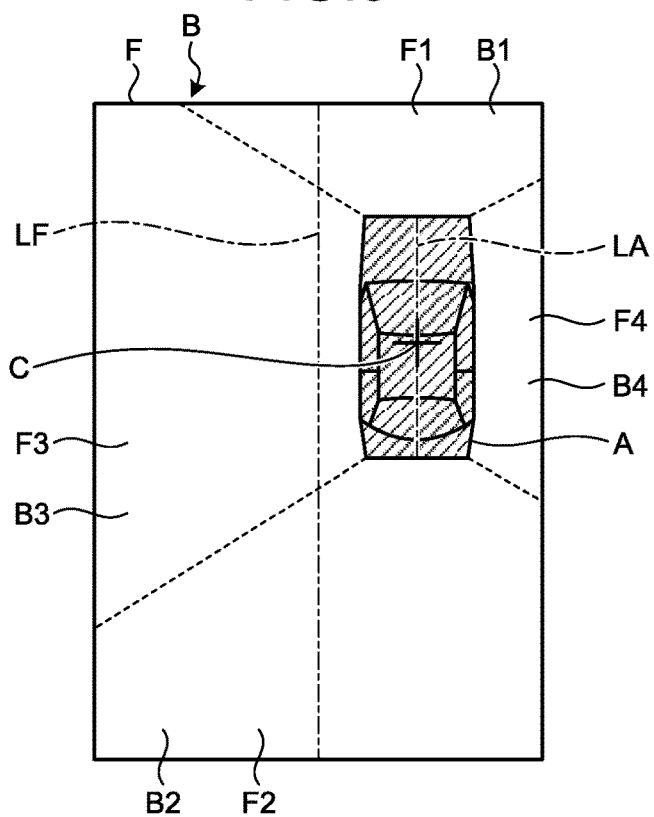
FIG. 5 is a diagram illustrating another exemplary bird's-eye view video that is generated by a bird's-eye view video generation system according to a third embodiment.

With reference to FIG. 5, the bird's-eye view video generation system 1 according to a third embodiment will be described. FIG. 5 is a diagram illustrating another exemplary bird's-eye view video that is generated by the bird's-eye view video generation system according to the third embodiment. The bird's-eye view video generation system 1 of the third embodiment is different from the bird's-eye view video generation system 1 of the first embodiment in processes performed by the bird's-eye view video generation device 40.

When generating the bird's-eye view video B in which the virtual vehicle image A is shifted at step S14 in the flowchart represented in FIG. 2, the display controller 43b generates the bird's-eye view video B with the reduced virtual vehicle image A. More specifically, when positioning the virtual vehicle image A at the upper left or the upper right of the frame F in the bird's-eye view video B, the display controller 43b reduces the virtual vehicle image A. Display of the virtual vehicle image A in a reduced size refers to display of the reduced virtual vehicle image A relatively to that in FIG. 3 resulting from display of the bird's-eye view video B in a wider area.

In the third embodiment, the direction in which the vehicle 100 moves is the left direction and, as illustrated in FIG. 5, the vehicle 100 is displayed smaller than that in FIG. 3 at the upper right of the frame F in the bird's-eye view video B. The bird's-eye view video B contains the virtual vehicle image A that is reduced, the rear video B2 and the left video B3 each in a wide area, and the front video B1 and the right video B4 each in a narrow area. The frame F contains the second frame F2 and the third frame F3 more widely and contains the first frame F1 and the fourth frame F4 narrowly. Thus, the left side corresponding to the direction in which the vehicle 100 moves and the rear are displayed more widely in the bird's-eye view video B.

As described above, the bird's-eye view video generation system 1 according to the third embodiment is able to generate the bird's-eye view video B with the reduced virtual vehicle video image A. Accordingly, the bird's-eye view video generation system 1 enables much wider display in the direction in which the vehicle 100 moves and much wider display of the rear of the vehicle 100. Thus, the bird's-eye view video generation system 1 makes it possible to properly check information about the surroundings of the vehicle 100, more specifically, information to note when moving the vehicle 100 in the turning direction, according to move of the vehicle 100 in the turning direction.

Fourth Embodiment

Figure 6:
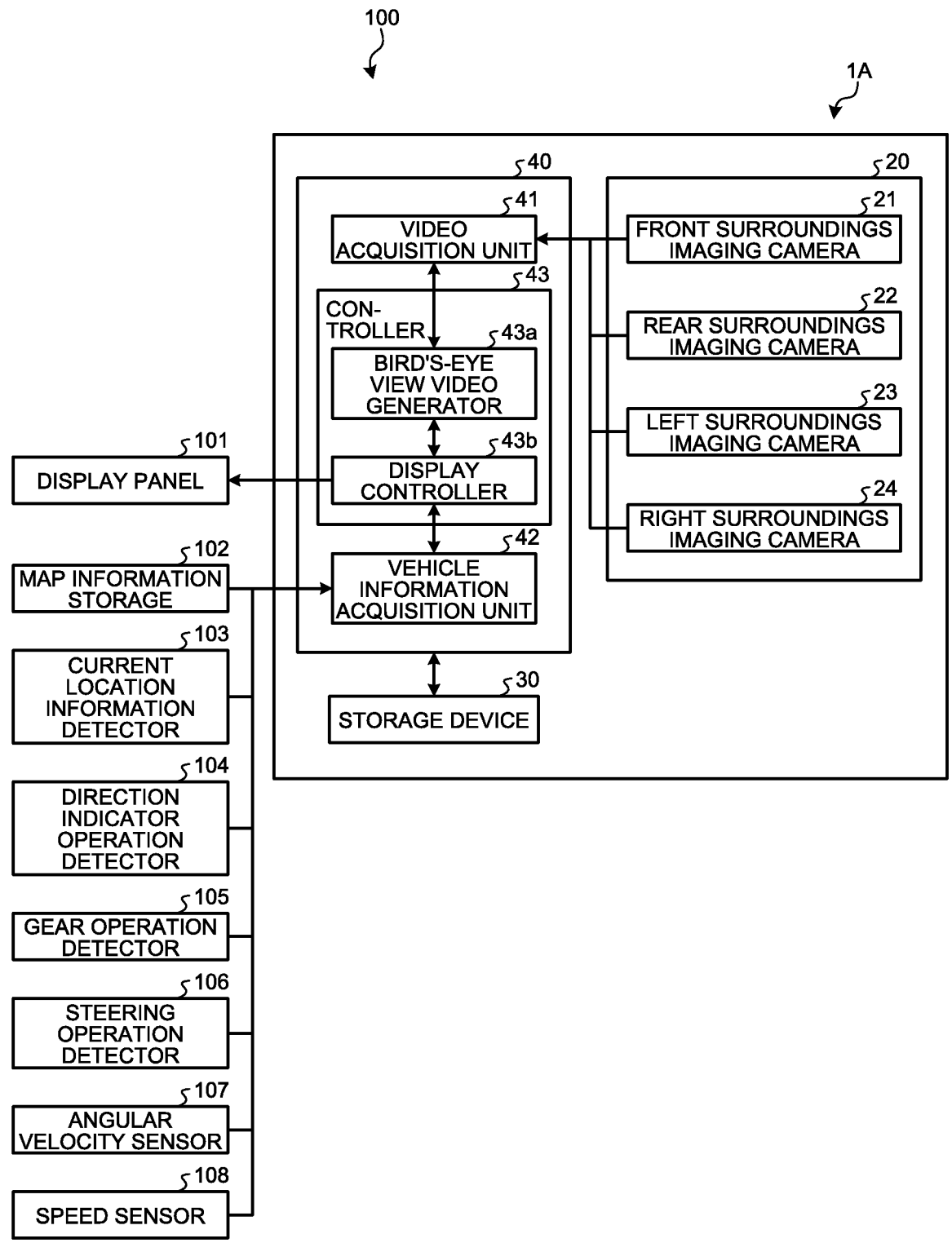
FIG. 6 is a block diagram illustrating an exemplary configuration of a bird's-eye view video generation system according to a fourth embodiment.
Figure 7:
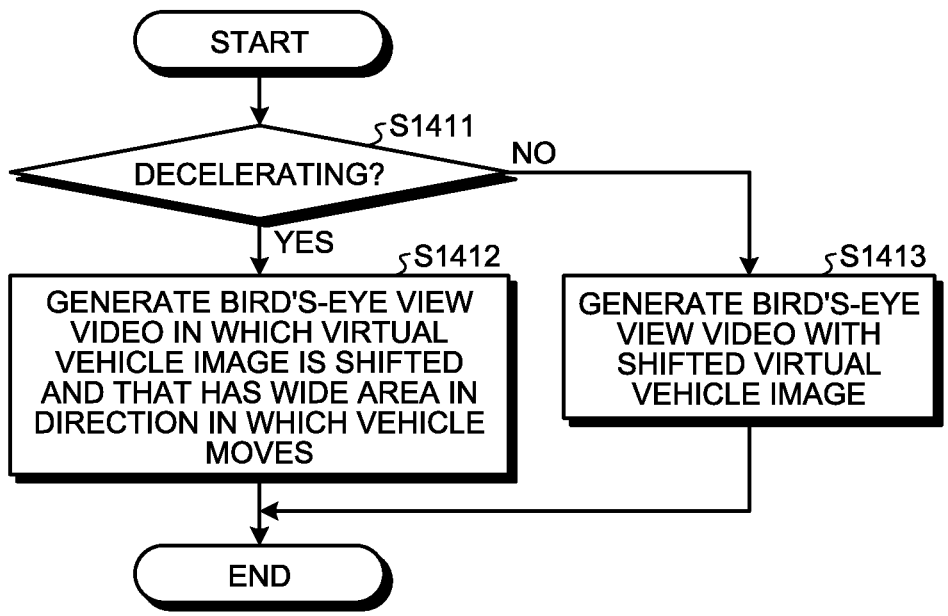
FIG. 7 is a flowchart representing a flow of processes performed by a bird's-eye view video generation device of the bird's-eye view video generation system according to the fourth embodiment.
Figure 8:
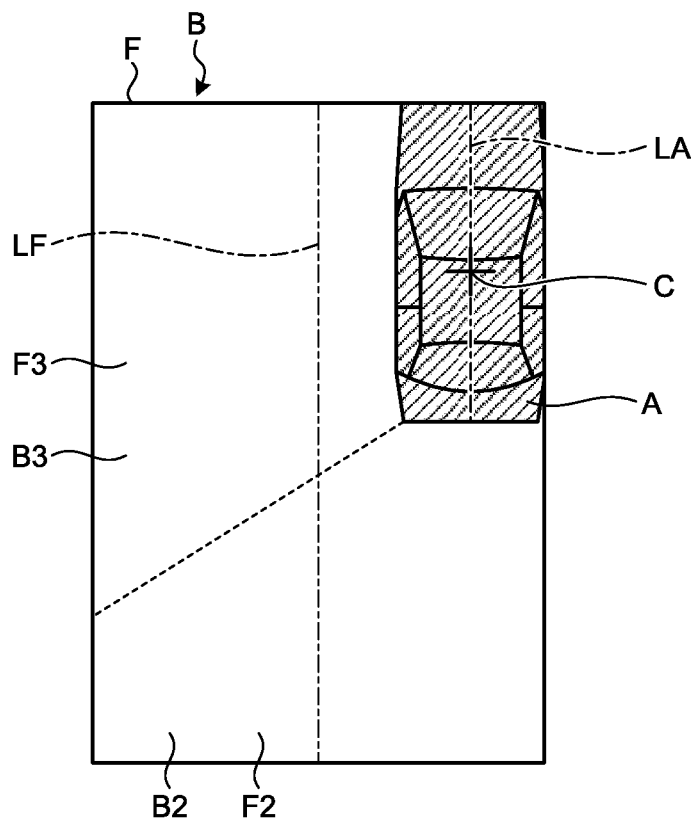
FIG. 8 is a diagram illustrating another exemplary bird's-eye view video that is generated by the bird's-eye view video generation system according to the fourth embodiment.

With reference to FIGS. 6 to 8, a bird's-eye view video generation system 1A of a fourth embodiment will be described. FIG. 6 is a block diagram illustrating an exemplary configuration of the bird's-eye view video generation system according to the fourth embodiment. The bird's-eye view video generation system 1A of the fourth embodiment is different from the bird's-eye view video generation system 1 of the first embodiment in that the vehicle information acquisition unit 42 of the bird's-eye view video generation device 40 further acquires a vehicle speed from a speed sensor (speed acquisition unit) 108.

The speed sensor 108 detects a vehicle speed of the vehicle 100. More specifically, the speed sensor 108 is arranged on the drive shaft of the vehicle 100 or a tire. The speed sensor 108 detects pulse signals corresponding to rotation of the drive shaft or the tire. The speed sensor 108 outputs the detected vehicle speed to the vehicle information acquisition unit 42 of the bird's-eye view video generation device 40 of the bird's-eye view video generation system 1.

The vehicle information acquisition unit 42 further acquires the vehicle speed that is output by the speed sensor 108. The vehicle information acquisition unit 42 outputs the vehicle information containing the acquired vehicle speed to the display controller 43b.

At step S14 in the flowchart represented in FIG. 2, when generating the bird's-eye view video B with the shifted virtual vehicle image A, the display controller 43b generates, based on the vehicle speed acquired by the vehicle information acquisition unit 42, the bird's-eye view video B having a wider area in the direction in which the vehicle 100 moves in a situation where the vehicle 100 is decelerating than that in a situation where the vehicle 100 is accelerating. The display controller 43b proceeds to step S14 in the flowchart represented in FIG. 2 and performs the processes in the flowchart represented in FIG. 7. FIG. 7 is a flowchart representing a flow of processes performed by the bird's-eye view video generation device of the bird's-eye view video generation system according to the fourth embodiment.

The display controller 43b determines whether the vehicle 100 is decelerating (step S1411). When the vehicle 100 is decelerating (YES at step S1411), the display controller 43b generates the bird's-eye view video B in which the virtual vehicle image A is shifted and that has a wide area in the direction in which the vehicle 100 moves (step S1412). More specifically, when positioning the virtual vehicle image A at the upper left of the frame F in the bird's-eye view video B, the display controller 43b moves and positions the virtual vehicle image A to and at the upper left end of the frame F. When positioning the virtual vehicle image A at the upper right of the frame F in the bird's-eye view video B, the display controller 43b moves and positions the virtual vehicle image A to and at the upper right end of the frame F.

When the vehicle 100 is not decelerating (NO at step S1411), the display controller 43b generates the bird's-eye view video B with the shifted virtual vehicle image A (step S1413). The process at step S1413 is the same as the process at step S14.

In the fourth embodiment, the direction in which the vehicle 100 moves is the left direction and, as illustrated in FIG. 8, the bird's-eye view video B is displayed with the virtual vehicle image A moved to the upper right end of the frame F. FIG. 8 is a diagram illustrating another exemplary bird's-eye view video that is generated by the bird's-eye view video generation system according to the fourth embodiment. The center C of the virtual vehicle image A is in a position closer to the upper right end than the center C of the virtual vehicle image A in FIG. 3 is. The bird's-eye view video B contains the virtual vehicle image A and the rear video B2 and the left video B3 each in a wide area. The frame F contains the second frame F2 and the third frame F3 and does not contain the first frame F1 and the fourth frame F4. Thus, the left side corresponding to the direction in which the vehicle 100 moves and the rear are displayed more widely.

As described above, the bird's-eye view video generation system 1A according to the fourth embodiment is able to generate the bird's-eye view video B having a wider area in the direction in which the vehicle 100 moves in the situation where the vehicle 100 is decelerating than that in the situation where the vehicle 100 is accelerating. The bird's-eye view video generation system 1A thus makes it possible display the direction in which the vehicle 100 moves and the rear much widely. Thus, the bird's-eye view video generation system 1A makes it possible to properly check information about the surroundings of the vehicle 100, more specifically, information to note when moving the vehicle 100 in the turning direction, according to whether the vehicle 100 is decelerating or accelerating in addition to move of the vehicle 100 in the turning direction.

Fifth Embodiment

Figure 9:
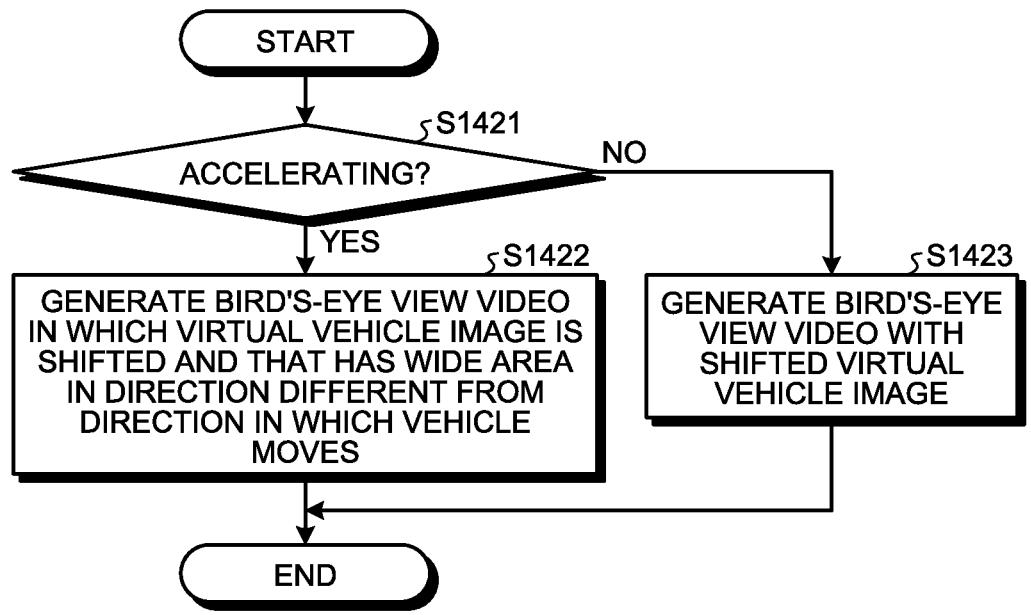
FIG. 9 is a flowchart representing a flow of processes performed by a bird's-eye view video generation device of a bird's-eye view video generation system according to a fifth embodiment.
Figure 10:
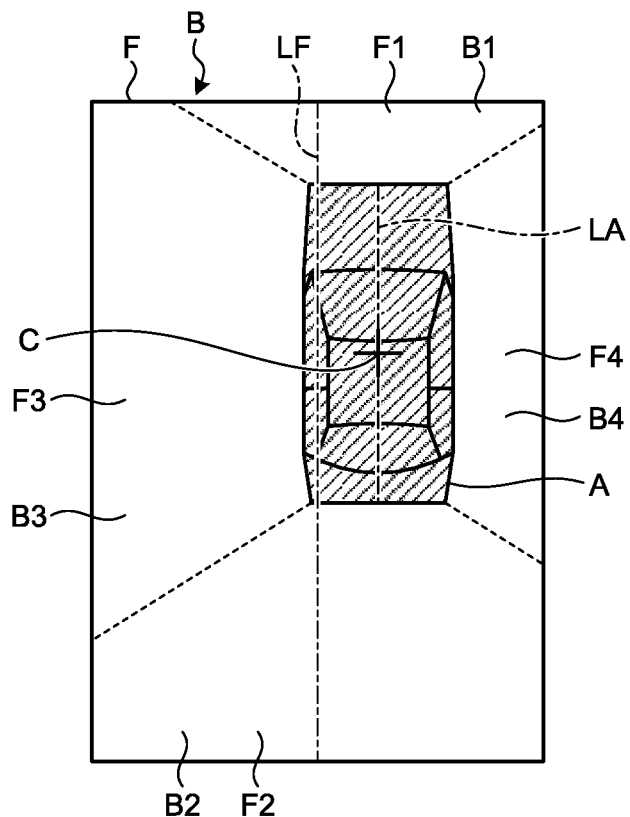
FIG. 10 is a diagram illustrating another exemplary bird's-eye view video that is generated by the bird's-eye view video generation system according to the fifth embodiment.

With reference to FIGS. 9 and 10, the bird's-eye view video generation system 1A according to a fifth embodiment will be described. The bird's-eye view video generation system 1A of the fifth embodiment is different from the bird's-eye view video generation system 1A of the fourth embodiment in processes performed by the bird's-eye view video generation device 40.

When generating the bird's-eye view video B with the shifted virtual vehicle image A at step S14 in the flowchart represented in FIG. 2, the display controller 43b generates, based on the vehicle speed that is acquired by the vehicle information acquisition unit 42, the bird's-eye view video B having a wider area in the direction opposite to the direction in which the vehicle 100 moves in the turning direction in the situation where the vehicle 100 is accelerating than that in the situation where the vehicle 100 is decelerating. The display controller 43b proceeds to step S14 in the flowchart represented in FIG. 2 and performs the processes in the flowchart represented in FIG. 9. FIG. 9 is a flowchart representing a flow of processes performed by the bird's-eye view video generation device of the bird's-eye view video generation system according to the fifth embodiment.

The display controller 43b determines whether the vehicle 100 is accelerating (step S1421). When the vehicle 100 is accelerating (YES at step S1421), the display controller 43b generates the bird's-eye view video B in which the virtual vehicle image A is shifted and that has a wide area in the direction opposite to the direction in which the vehicle 100 moves in the turning direction (step S1422). More specifically, when positioning the virtual vehicle image A at the upper left of the frame F in the bird's-eye view video B, the display controller 43b positions the virtual vehicle image A such that the virtual vehicle image A separates from the upper left end of the frame F. When positioning the virtual vehicle image A at the upper right of the frame F in the bird's-eye view video B, the display controller 43b positions the virtual vehicle image A such that the virtual vehicle image A separates from the upper right end of the frame F.

When the vehicle 100 is not accelerating (NO at step S1421), the display controller 43b generates the bird's-eye view video B with the shifted virtual vehicle image A (step S1423). The process at step S1423 is the same as the process at step S14.

In the fifth embodiment, the direction in which the vehicle 100 moves is the left direction and, as illustrated in FIG. 10, the bird's-eye view video is displayed with the virtual vehicle image A separating from the upper right end of the frame F. FIG. 10 is a diagram illustrating another exemplary bird's-eye view video that is generated by the bird's-eye view video generation system according to the fifth embodiment. The center C of the virtual vehicle image A is in a position closer to the center than the center C of the virtual vehicle image A in FIG. 3 is. The frame F contains the second frame F2 and the third frame F3 more widely and contains the first frame F1 and the fourth frame F4 narrowly. The bird's-eye view video B contains the virtual vehicle image A, the rear video B2 and the left video B3 each in a wide area, and the front video B1 and the right video B4 each in a narrow area. Thus, the direction opposite to the direction in which the vehicle 100 moves is displayed in the bird's-eye view video B in addition to the left side corresponding to the direction in which the vehicle 100 moves and the rear.

As described above, the bird's-eye view video generation system 1A according to the fifth embodiment is able to generate the bird's-eye view video B having a wider area in the direction opposite to the direction in which the vehicle 100 moves in the turning direction in the situation where the vehicle 100 is accelerating than that in the situation where the state where the vehicle 100 is decelerating. For this reason, the bird's-eye view video generation system 1A is able to display the direction opposite to the direction in which the vehicle 100 moves in addition to the direction in which the vehicle 100 moves and the rear. Accordingly, in the situation where the vehicle 100 is accelerating, a driver is able to check, in addition to the direction in which the vehicle 100 moves, the direction opposite to the direction in which the vehicle 100 moves in the turning direction with the bird's-eye view video B. Thus, the bird's-eye view video generation system 1A makes it possible to properly check information about the surroundings of the vehicle 100, more specifically, information to note when moving the vehicle 100 in the turning direction, according to whether the vehicle 100 is decelerating or accelerating in addition to move of the vehicle 100 in the turning direction.

Sixth Embodiment

Figure 11:
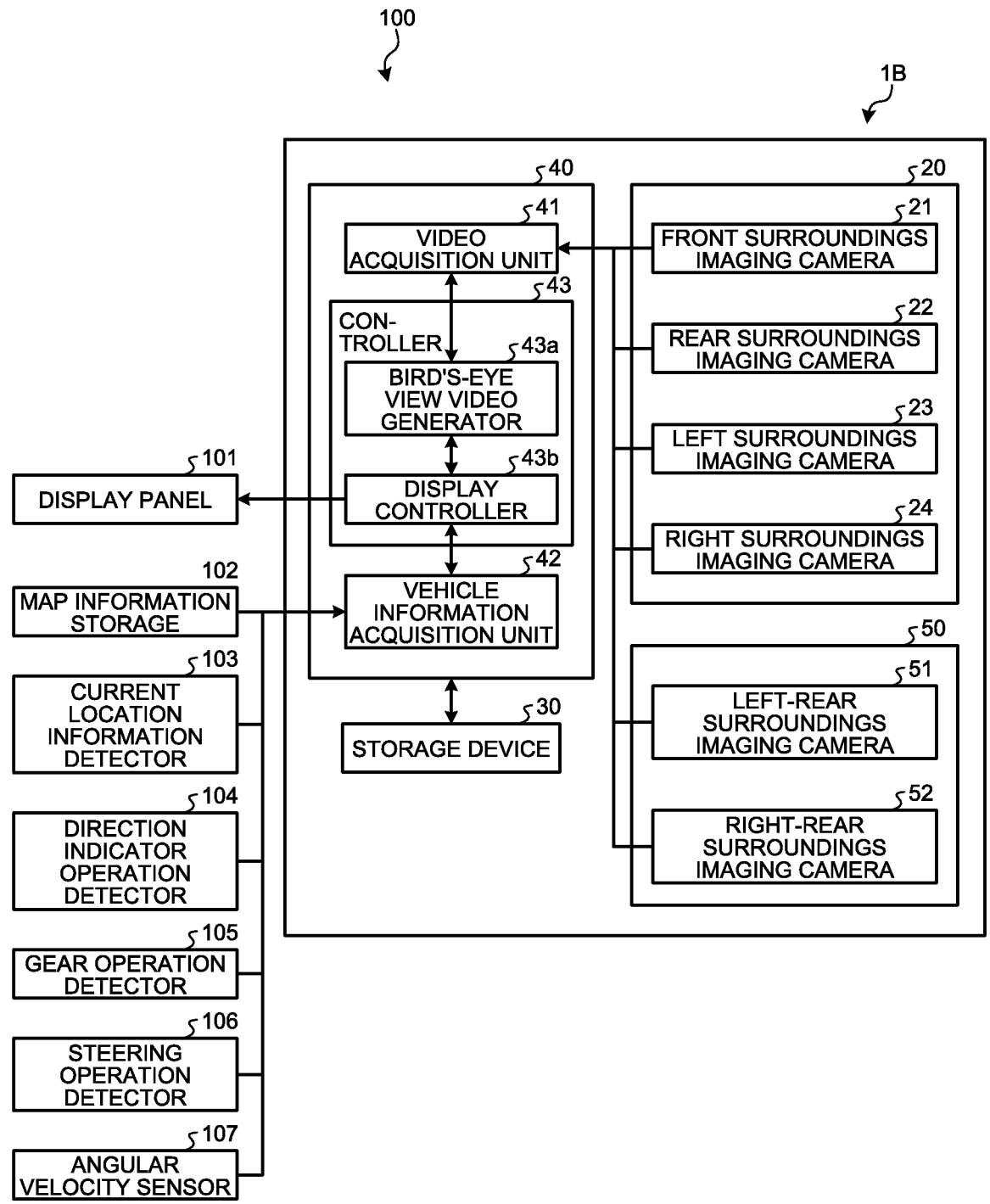
FIG. 11 is a block diagram illustrating an exemplary configuration of a bird's-eye view video generation system according to a sixth embodiment.
Figure 12:
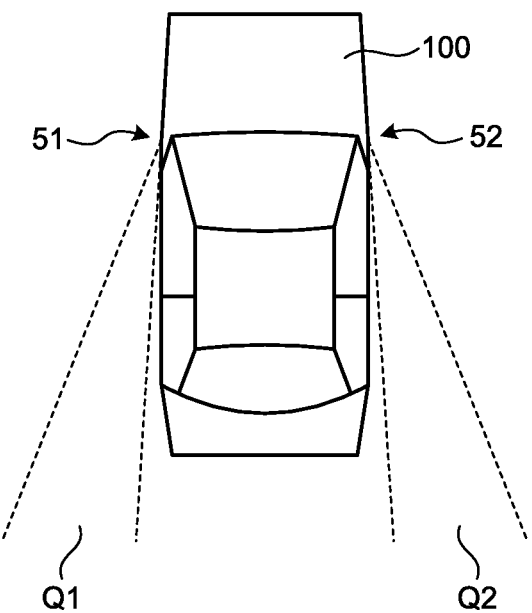
FIG. 12 is a plane view representing areas of which videos are captured by a left-rear surroundings imaging camera and a right-rear surroundings imaging camera of the bird's-eye view video generation system according to the sixth embodiment.
Figure 13:
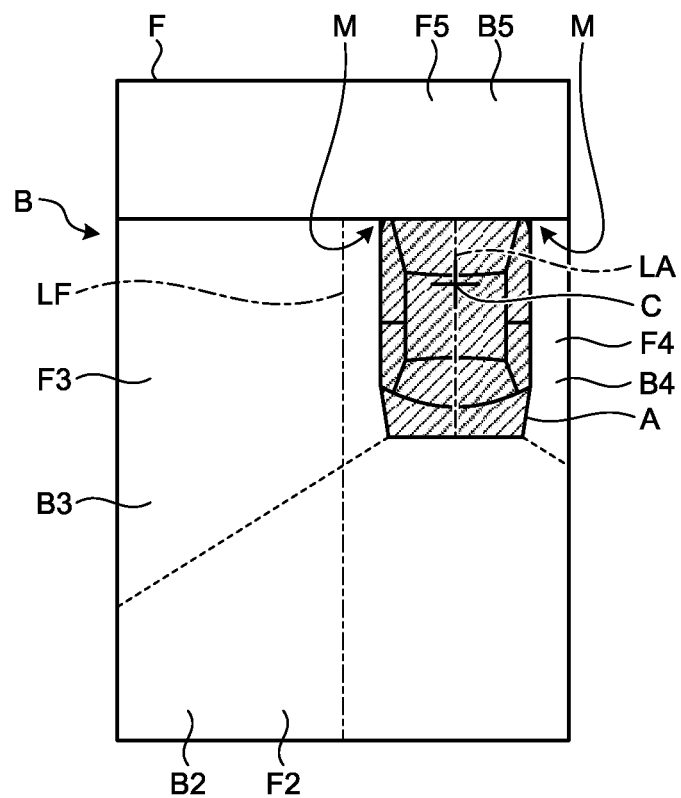
FIG. 13 is a diagram illustrating a bird's-eye view video that is generated by the bird's-eye view video generation system according to the sixth embodiment.

With reference to FIGS. 11 to 13, a bird's-eye view video generation system 1B according to a sixth embodiment will be described. FIG. 11 is a block diagram illustrating an exemplary configuration of the bird's-eye view video generation system according to the sixth embodiment. The bird's-eye view video generation system 1B according to the sixth embodiment is different from the bird's-eye view video generation system 1 of the first embodiment in that the bird's-eye view video generation system 1B further includes a second imaging device 50.

As illustrated in FIG. 12, the second imaging device 50 includes a left-rear surroundings imaging camera 51 that captures a video of the left rear Q1 of the vehicle 100 and a right-rear surroundings imaging camera 52 that captures a video of the right rear Q2 of the vehicle 100. FIG. 12 is a plane view representing an area of which videos are captured by the left-rear surroundings imaging camera and the right-rear surroundings imaging camera of the bird's-eye view video generation system according to the sixth embodiment. The second imaging device 50 outputs the videos that are captured by the left-rear surroundings imaging camera 51 and the right-rear surroundings imaging camera 52 to the video acquisition unit 41 of the bird's-eye view video generation device 40.

The left-rear surroundings imaging camera 51 captures a video of an area denoted with the reference number Q1 in FIG. 12. The area denoted with the reference number Q1 is an area containing a blind area caused at the left rear when the driver performs checking with the side mirror and the rearview mirror and checking by sight when turning the vehicle 100 left. The left-rear surroundings imaging camera 51 outputs the captured video to the video acquisition unit 41 of the bird's-eye view video generation device 40.

The right-rear surroundings imaging camera 52 captures a video of an area denoted with the reference number Q2 in FIG. 12. The area denoted with the reference number Q2 is an area containing a blind area caused at the right rear when the driver performs checking with the side mirror and the rearview mirror and checking by sight when turning the vehicle 100 right. The right-rear surroundings imaging camera 52 outputs the captured video to the video acquisition unit 41 of the bird's-eye view video generation device 40.

The video acquisition unit 41 further acquires the surroundings videos that are output by the left-rear surroundings imaging camera 51 and the right-rear surroundings imaging camera 52. The video acquisition unit 41 outputs surroundings videos containing the left-rear surroundings video and the right-rear surroundings video, which are acquired, to the bird's-eye view video generator 43a.

When generating the bird's-eye view video B with the shifted virtual vehicle image A at step S14 in the flowchart represented in FIG. 2, the display controller 43b generates a side rear video B5 in the direction in which the vehicle 100 moves, which is acquired by the video acquisition unit 41. The display controller 43b displays the bird's-eye view video B in a lower part of the frame F and generates the side rear video B5 that is displayed in a fifth frame F5 that is positioned in an upper part of the frame F. For example, the fifth frame F5 may be in a position within the frame F corresponding to the front with respect to the side mirrors M of the virtual vehicle image A. For example, the fifth frame F5 may be in a position within the frame F corresponding to a given area, such as a third of the upper part of the frame F.

In the sixth embodiment, the direction in which the vehicle 100 moves is the left direction and, as illustrated in FIG. 13, the bird's-eye view video B is displayed in the lower part of the frame F and the side rear video B is displayed in the upper part of the frame F. FIG. 13 is a diagram representing the bird's-eye view video that is generated by the bird's-eye view video generation system according to the sixth embodiment. The frame F contains the second frame F2 and the third frame F3 more widely, contains the fourth frame F4 narrowly, and does not contain the first frame F1. The frame F further contains the fifth frame F5 in the upper part of the frame F. The fifth frame F5 is in a position within the frame F corresponding to the front with respect to the side mirrors M of the virtual vehicle image A.

As described above, the bird's-eye view video generation system 1B according to the sixth embodiment is able to generate, together with the bird's-eye view video B, a video in which a side rear video B5 corresponding to the blind area to the driver when the driver turns the vehicle 100 right or left. For this reason, the bird's-eye view video generation system 1B is able to display the direction in which the vehicle 100 moves and the rear more assuredly. This enables the driver to check, in addition to the direction in which the vehicle 100 moves, the area corresponding to the blind area to the driver when the driver turns the vehicle 100 right or left with the side rear video B5. Thus, the bird's-eye view video generation system 1B makes it possible to more properly check information about the surroundings of the vehicle 100, more specifically, information to note when moving the vehicle 100 in the turning direction according to the move of the vehicle 100 in the turning direction.

Seventh Embodiment

Figure 14:
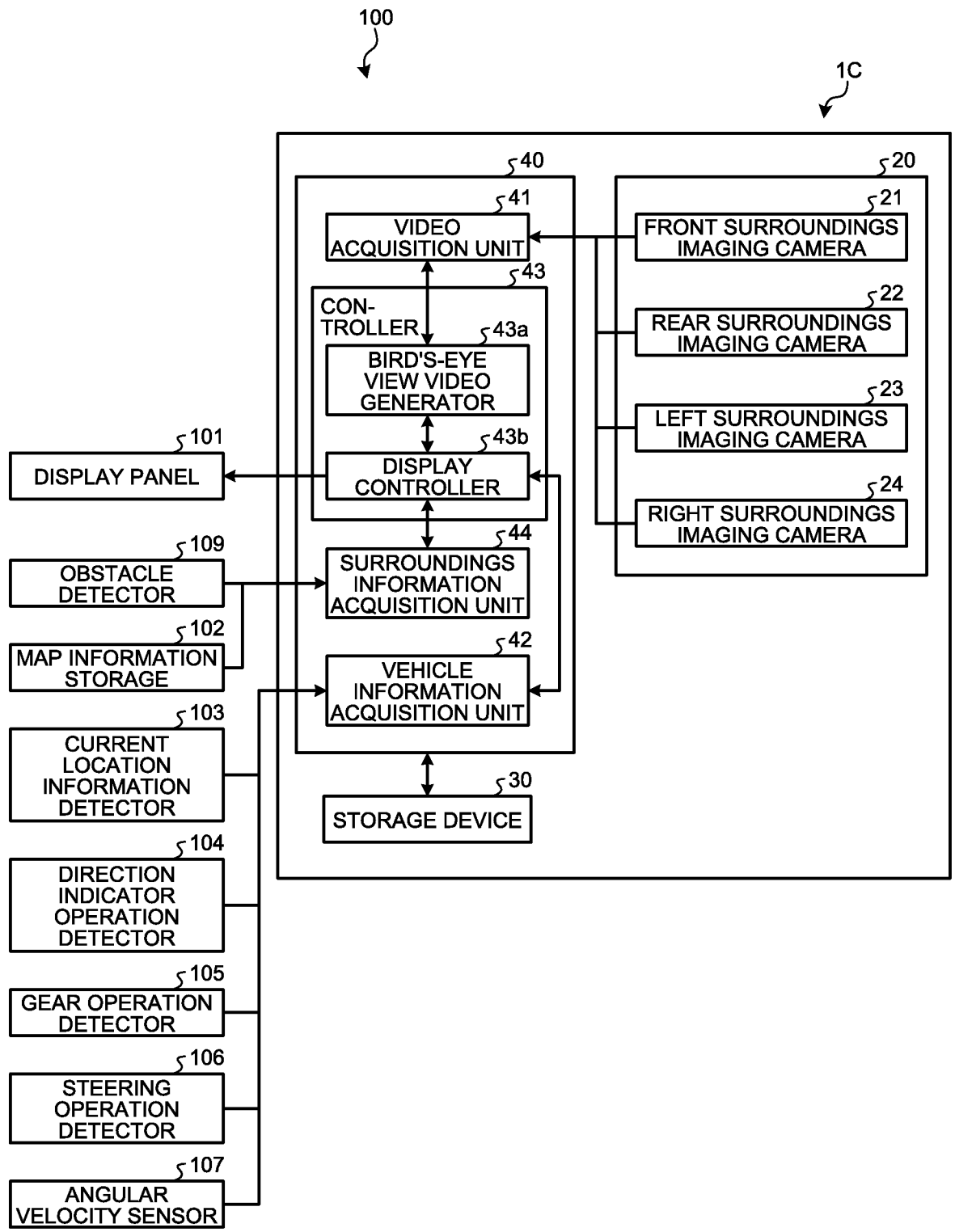
FIG. 14 is a block diagram illustrating an exemplary configuration of a bird's-eye view video generation system according to a seventh embodiment.

FIG. 14 is a block diagram illustrating an exemplary configuration of a bird's-eye view video generation system according to a seventh embodiment. A bird's-eye view video generation system 1C of the seventh embodiment is different from the bird's-eye view video generation system 1 of the first embodiment in that the bird's-eye view video generation device 40 includes a surroundings information acquisition unit 44 to acquire obstacle information about an obstacle X that is detected by an obstacle detector 109.

In the seventh embodiment, the bird's-eye view video generation system 1C does not include the display panel 101, the map information storage 102, the current location information detector 103, the direction indicator operation detector 104, the gear operation detector 105, the steering operation detector 106, the angular velocity sensor 107, and the obstacle detector 109. Alternatively, the bird's-eye view video generation system 1 may include each of the components.

The map information storage 102, for example, stores map information that is a roadmap containing intersections and road width information. The map information storage 102 outputs the stored map information to the surroundings information acquisition unit 44 of the bird's-eye view video generation device 40 of the bird's-eye view video generation system 1C.

The obstacle detector 109 is a sensor that detects an obstacle X around the vehicle 100. The obstacle X includes, for example, walls, curbs, guardrails, road-sign poles, utility poles, bikes, pedestrians, and other stopped or parked vehicles. More specifically, the obstacle detector 109 detects the obstacle X that is present within a given area with respect to the vehicle 100. The given area is, for example, five meters. The obstacle detector 109 outputs obstacle information about the detected obstacle X to the surroundings information acquisition unit 44 of the bird's-eye view video generation device 40 of the bird's-eye view video generation system 1C.

The surroundings information acquisition unit 44 acquires information about the surroundings of the vehicle 100. The information about the surroundings of the vehicle 100 includes the obstacle information about the obstacle X around the vehicle 100 and the map information containing road widths of roads around the vehicle 100. More specifically, the surroundings information acquisition unit 44 acquires vehicle information that is output by the obstacle detector 109 or the map information storage 102. The surroundings information acquisition unit 44 outputs the acquired surroundings information to the display controller 43b.

The vehicle information acquisition unit 42 acquires vehicle information to estimate move of the vehicle 100 in a turning direction in which the vehicle 100 turns. The information to estimate move of the vehicle 100 in the turning direction is vehicle information that is at least any one of current location information about the vehicle 100, the direction indicator operation information about the vehicle 100, the gear operation information about the vehicle 100, the steering operation information about the vehicle 100, and the angular velocity of the vehicle 100. The vehicle information acquisition unit 42 acquires the vehicle information that is output by at least any one of the current location information detector 103, the direction indicator operation detector 104, the gear operation detector 105, the steering operation detector 106, and the angular velocity sensor 107.

The controller 43 processes, with the display controller 43b, the bird's-eye view video B, which is generated by the bird's-eye view video generator 43a, such that the bird's-eye view video B is rotated and then is displayed on the display panel 101 and transmits the processed bird's-eye view video B to the display panel 101. The controller 43 processes, with the display controller 43b, the bird's-eye view video B, which is generated by the bird's-eye view video generator 43a, such that the bird's-eye view video B is rotated and enlarged and then is displayed on the display panel 101 and transmits the processed bird's-eye view video B to the display panel 101.

When move of the vehicle 100 in the turning direction is estimated and information to note when moving the vehicle 100 in the turning direction is present around the vehicle 100 based on the surroundings information that is acquired by the surroundings information acquisition unit 44 and according to the vehicle information that is acquired by the vehicle information acquisition unit 42, the display controller 43b generates the bird's-eye view video B inclined such that a side-surface front P1 of the virtual vehicle image A on an outer-wheel side with respect to the turning direction is positioned on an upper side. For example, when turning right or left, the vehicle 100 moves in the turning direction.

When there is the obstacle X with a distance smaller than a given value from the vehicle 100 when the vehicle 100 moves in the turning direction (referred to as "the obstacle X around the vehicle 100" below) as information to note when moving the vehicle 100 in the turning direction, or when the width of a road passed by the vehicle 100 when the vehicle 100 moves in the turning direction is smaller than a given value, the display controller 43b determines that there is information to note when moving the vehicle 100 in the turning direction.

Figure 15:
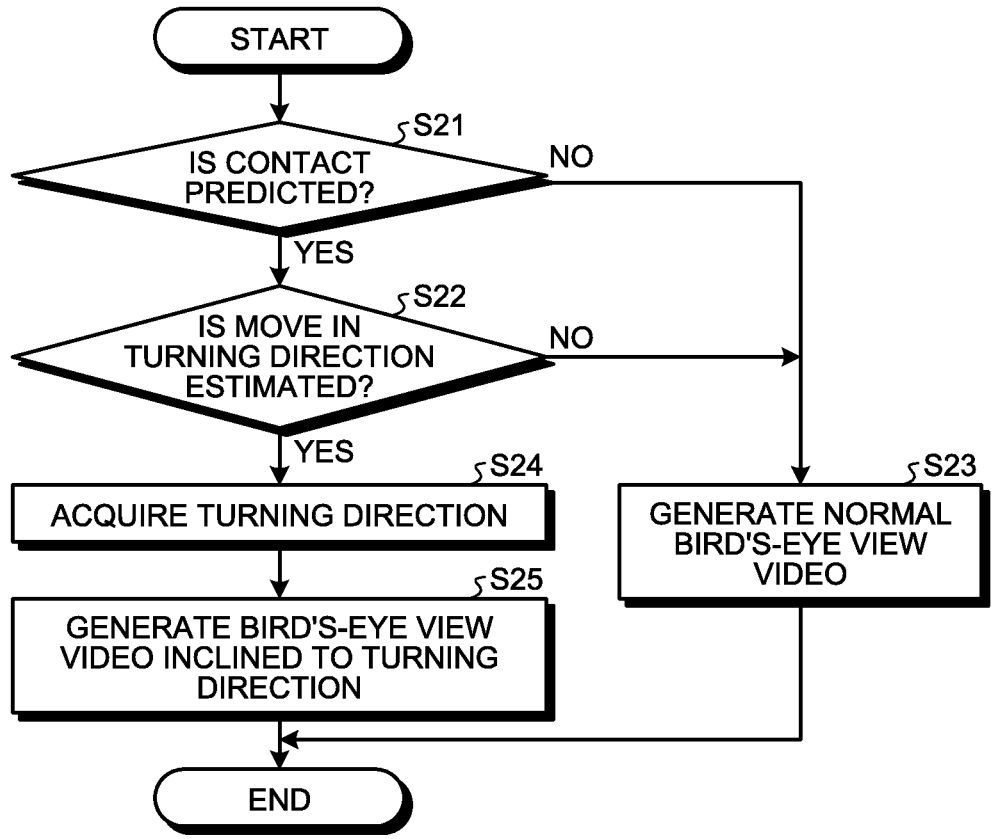
FIG. 15 is a flowchart representing a flow of processes performed by a bird's-eye view video generation device of the bird's-eye view video generation system according to the seventh embodiment.

With reference to FIG. 15, a flow of processes performed by the bird's-eye view video generation device 40 of the bird's-eye view video generation system 1C will be described. FIG. 15 is a flowchart representing a flow of processes performed by the bird's-eye view video generation device of the bird's-eye view video generation system according to the seventh embodiment.

The display controller 43b determines whether contact is predicted (step S21). When there is the obstacle X around the vehicle 100, or when the width of the road to be passed by the vehicle 100 when the vehicle 100 moves in the turning direction is smaller than the given value, the display controller 43b determines that contact is predicted (YES). There is not the obstacle X around the vehicle 100, or when the width of the road to be passed by the vehicle 100 when the vehicle 100 moves in the turning direction is larger than or equal to the given value, contact is not predicted (NO).

For example, the display controller 43b determines whether there is the obstacle X around the vehicle 100 based on the obstacle information that is acquired by the surroundings information acquisition unit 44. The distance from the vehicle 100 smaller than the given distance is, for example, an area within, for example, one meter from the vehicle 100 in the direction in which the vehicle 100 moves (the turning direction).

For example, the display controller 43b determines whether the width of the road passed through when the vehicle 100 moves in the turning direction is smaller than the given value based on the map information containing the width of the road passed when the vehicle 100 moves in the turning direction, which is the information acquired by the surroundings information acquisition unit 44. More specifically, the display controller 43b determines whether the width of the road in the direction in which the vehicle 100 turns is smaller than the given value. The given value is, for example, four meters.

Figure 16:
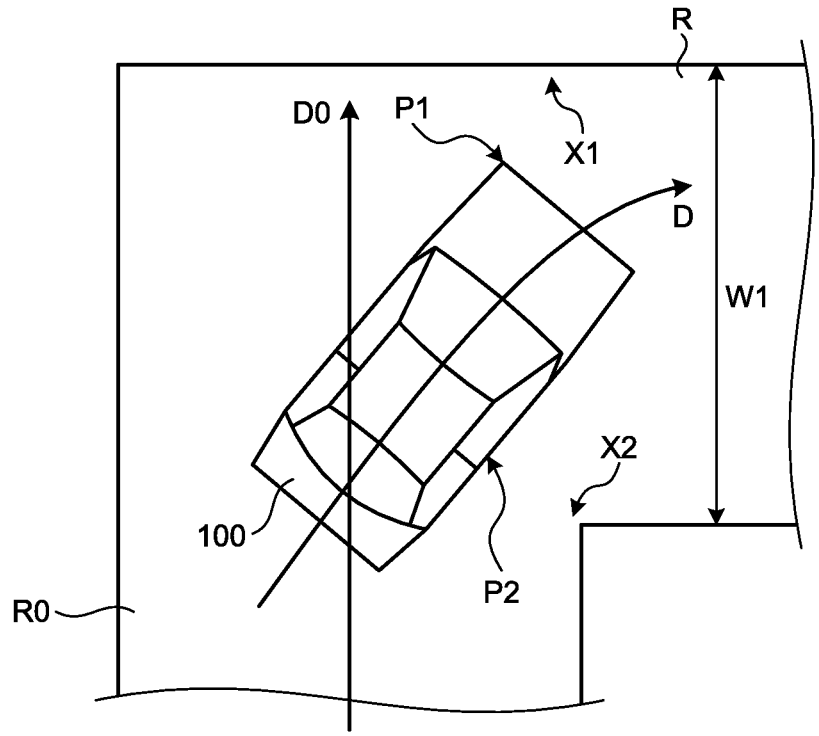
FIG. 16 is a schematic diagram illustrating circumstances around a vehicle that uses the bird's-eye view video generation system according to the seventh embodiment.

With reference to FIG. 16, the obstacle X around the vehicle 100 will be described. FIG. 16 is a schematic diagram illustrating circumstances around the vehicle that uses the bird's-eye view video generation system according to the seventh embodiment. FIG. 16 represents a direction in which a road RO on which the vehicle 100 is traveling extends as a travel road direction DO and represents the direction in which the vehicle 100 turns as D. When the vehicle 100 moves in the turning direction D, the side-surface front P1 on the outer-wheel side with respect to the turning direction D and a side surface P2 of the vehicle 100 on an inner-wheel side with respect to the turning direction D tend to contact the obstacle X. In other words, when the vehicle 100 moves in the turning direction D to turn right or left, the side-surface front P1 on a side opposite to the center of rotation of the vehicle 100 and the side surface P2 on the side of the center of rotation of the vehicle 100 tend to contact the obstacle X. According to FIG. 16, the vehicle 100 turns right. The road R in the turning direction D has a width W1 smaller than the given value. A curb X2 is present on the side of the center of rotation in the position where the vehicle 100 turns right. For this reason, there is a risk that the side-surface front P1 of the vehicle 100 may contact a wall X1. There is a risk that the side surface P2 of the vehicle 100 may contact the curb X2. In this case, the display controller 43b determines that there is the obstacle X.

FIG. 15 will be referred back. When it is not determined that contact is predicted (NO at step S21), the display controller 43b proceeds to step S23.

When it is determined that contact is predicted (YES at step S21), the display controller 43b proceeds to step S22.

The display controller 43b determines whether move in the turning direction is estimated (step S22). More specifically, the display controller 43b determines whether move of the vehicle 100 in the turning direction is estimated based on at least any one of the map information about the surroundings of the vehicle 100 that is acquired by the surroundings information acquisition unit 44 and the current location information about the vehicle 100, the direction indicator operation information about the vehicle 100, the gear operation information about the vehicle 100, the steering operation information about the vehicle 100, and the angular velocity of the vehicle 100 that are acquired by the vehicle information acquisition unit 42.

A case where the display controller 43b determines whether move of the vehicle 100 in the turning direction is estimated based on the map information about the surroundings of the vehicle 100, which is acquired by the surroundings information acquisition unit 44, and the current location information about the vehicle 100, which is acquired by the vehicle information acquisition unit 42, will be described. For example, the display controller 43b determines that move of the vehicle 100 in the turning direction is estimated based on the map information about the surroundings of the vehicle 100 and the current location information about the vehicle 100 when the vehicle 100 gets close to an intersection where the vehicle 100 is supposed to turn right or left according to the route guide information and is going to be within a given distance from the intersection. The given distance may be, for example, five meters. When it is determined that move of the vehicle 100 in the turning direction is estimated, the display controller 43b stores the estimated direction in which the vehicle 100 turns in the storage device 30.

A case where the display controller 43b determines whether move of the vehicle 100 in the turning direction is estimated based on the map information about the surroundings of the vehicle 100 that is acquired by the surroundings information acquisition unit 44, the current location information about the vehicle 100 that is acquired by the vehicle information acquisition unit 42, and at least any one of the direction indicator operation information, the steering operation information, and the angular velocity of the vehicle 100 that are acquired by the vehicle information acquisition unit 42 will be described. For example, the display controller 43b determines that move of the vehicle 100 in the turning direction is estimated based on the map information about the surroundings of the vehicle 100, the current location information about the vehicle 100, and at least any one of the direction indicator operation information, the steering operation information, and the angular velocity of the vehicle 100 when the vehicle 100 gets close to an intersection where the vehicle 100 is supposed to turn right or left according to the route guide information and is going to be within the given distance from the intersection and the direction indicator is operated, or a steering operation is performed in a direction deviating from the travel road direction DO, or when the angular velocity changes to a direction deviating from the travel road direction DO. The given distance may be, for example, five meters. For example, when the deviation from the travel road direction DO is equal to or larger than 15 degrees, move in a deviating direction may be determined. Determination is made based on a combination of the map information about the surroundings of the vehicle 100, the current location information about the vehicle 100 and at least any one of the direction indicator operation information, the steering operation information and the angular velocity of the vehicle 100 not to erroneously estimate that the vehicle 100 will moves in the turning direction, for example, when the driver does not follow the route guide and goes straight although turning right or left is indicated by the route guide. When the display controller 43b determines that move of the vehicle 100 in the turning direction is estimated, the display controller 43b stores the estimated direction in which the vehicle 100 turns in the storage device 30.

Alternatively, the display controller 43b may determine whether move of the vehicle 100 in the turning direction is estimated according to another one of the methods described in the first embodiment and store the direction in which the vehicle 100 turns in the storage device 30.

When move of the vehicle 100 in the turning direction is not estimated (NO at step S22), the display controller 43b proceeds to step S23.

When it is estimated that the vehicle 100 will move in the turning direction (YES at step S22), the display controller 43b proceeds to step S24.

The display controller 43b generates the normal bird's-eye view video B (step S23). More specifically, the display controller 43b generates the bird's-eye view video B containing the virtual vehicle image A of the vehicle 100 looked down from above with the front-rear direction being positioned straightly in parallel with the top-down direction of the frame F. In the bird's-eye view video B, the center C of the virtual vehicle image A is positioned at the center of the frame F.

The display controller 43b acquires the direction in which the vehicle 100 turns (step S24). The display controller 43b acquires the direction in which the vehicle 100 turns and that is stored in the storage device 30 at step S22.

The display controller 43b generates the bird's-eye view video B that is inclined to the turning direction and is displayed on the display panel 101 (step S25). More specifically, the display controller 43b generates the bird's-eye view video B that contains the virtual vehicle image A inclined such that the side-surface front P1 of the virtual vehicle image A on the outer-wheel side with respect to the turning direction is positioned on the upper side of the frame F. In the embodiment, the display controller 43b displays, on the display panel 101, the bird's-eye view video B that contains the virtual vehicle image A and that is inclined by being rotated to the turning direction about the center C of the virtual vehicle image A.

More specifically, first of all, the display controller 43b determines in which of the left and right directions with respect to the travel road direction DO the direction in which the vehicle 100 turns is positioned. When it is determined that the direction in which the vehicle 100 turns is the right direction, the display controller 43b generates the bird's-eye view video B that is inclined against the frame F by being rotated clockwise about the center C of the virtual vehicle image A by a given angle. The given angle is, for example, equal to or larger than 20 degrees and equal to or smaller than 45 degrees. When it is determined that the direction in which the vehicle 100 turns is the left direction, the display controller 43b generates the bird's-eye view video B that is inclined against the frame F by being rotated counterclockwise about the center C of the virtual vehicle image A by a given angle. The given angle is, for example, equal to or larger than 20 degrees and equal to or smaller than 45 degrees. In this manner, the display controller 43b generates the bird's-eye view video B having a clockwise or counterclockwise inclination against the frame F. Accordingly, when the bird's-eye view video B has a clockwise inclination against the frame F, the front left of the virtual vehicle image A and the surroundings of the front left and the right side surface of the virtual vehicle image A and the surroundings of the right side surface are displayed widely in the bird's-eye view video B. When the bird's-eye view video B has a counterclockwise inclination against the frame F, the front right of the virtual vehicle image A and the surroundings of the front right and the left side surface of the virtual vehicle image A and the surroundings of the left side surface are displayed widely in the bird's-eye view video B. As the virtual vehicle image A represents the vehicle 100, it is possible to widely display the area around the vehicle 100 where information to note when moving in the turning direction.

Figure 17:
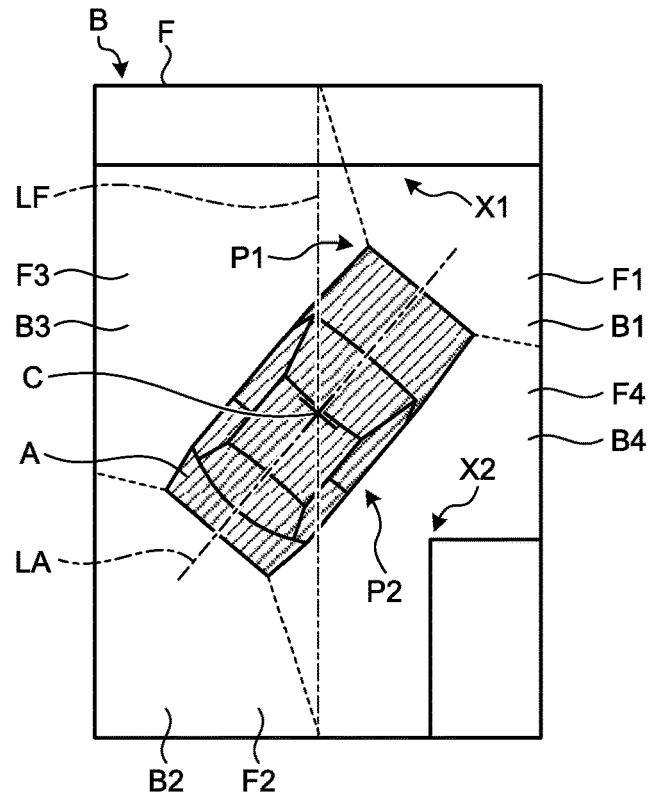
FIG. 17 is a diagram illustrating a bird's-eye view video that is generated by the bird's-eye view video generation system according to the seventh embodiment.

In the seventh embodiment, the direction in which the vehicle 100 turns is the right direction and, as illustrated in FIG. 17, the center line LA of the virtual vehicle image A has an inclination against the center line LF of the frame F in the bird's-eye view video B. FIG. 17 is a diagram illustrating a bird's-eye view video that is generated by the bird's-eye view video generation system according to the seventh embodiment. In the bird's-eye view video B, the side-surface front P1 of the vehicle 100, surroundings of the wall X1 that is the obstacle X, the side surface P2 of the vehicle 100, and the surroundings of the curb X2 that is the obstacle X are thus displayed widely.

Figure 18:
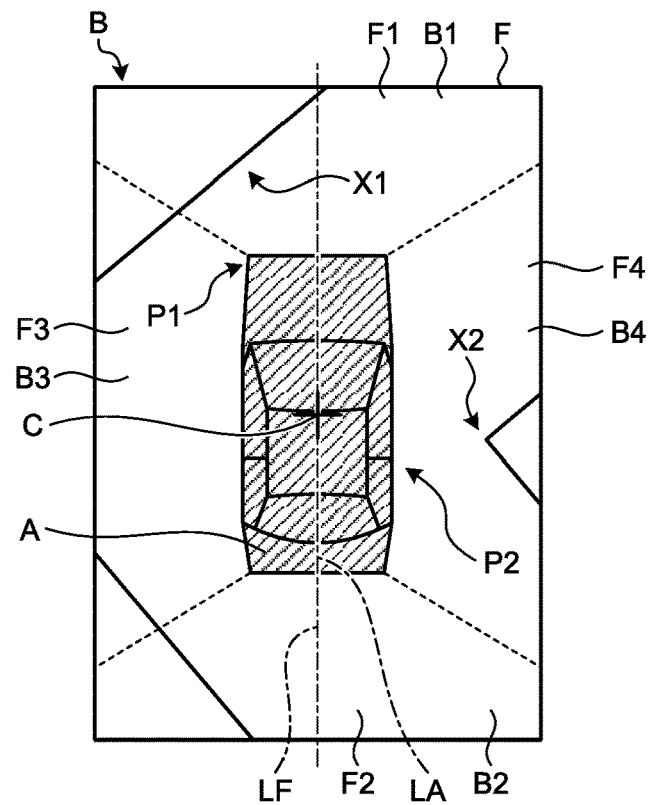
FIG. 18 is a diagram illustrating a conventional bird's-eye view video.

For comparison, a conventional bird's-eye view video B will be described with reference to FIG. 18. FIG. 18 is a diagram illustrating a conventional bird's-eye view video. As illustrated in FIG. 18, in the bird's-eye view video B, the virtual vehicle image A has no inclination against the frame F and the center line LA of the virtual vehicle image A matches the center line LF of the frame F. For this reason, in the bird's-eye view video B displayed in the rectangular frame F, the parts of the vehicle 100 that tend to make contact and the obstacle X, specifically, the side-surface front P1 of the vehicle 100, the surroundings of the wall X1, the side surface P2 of the vehicle 100, the surroundings of the curb X2 are displayed narrowly compared to FIG. 17.

Figure 19:
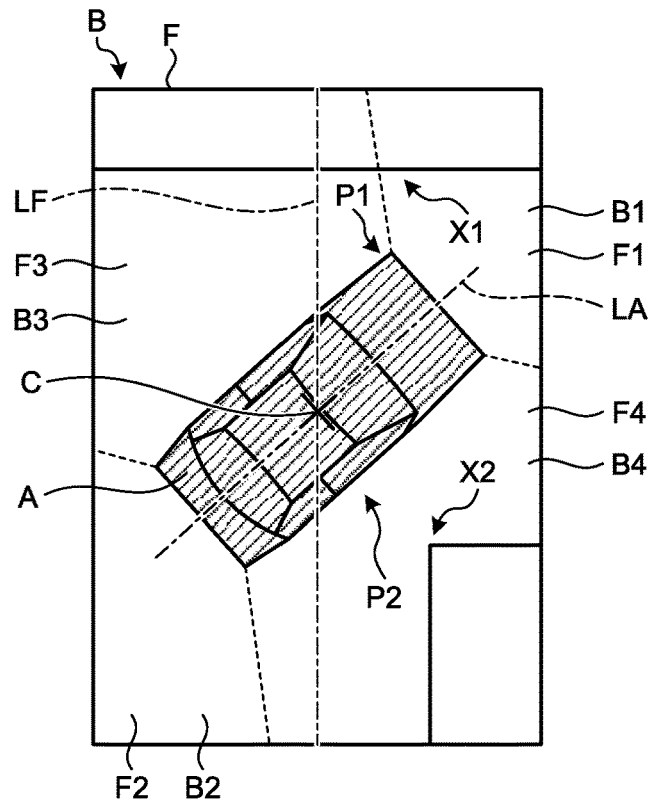
FIG. 19 is a diagram illustrating another exemplary bird's-eye view video that is generated by the bird's-eye view video generation system according to the seventh embodiment.

As illustrated in FIG. 19, in the bird's-eye view video B, the center line LA of the virtual vehicle image A may have a clockwise inclination of 45 degrees against the center line LF of the frame F. FIG. 19 is a diagram illustrating another exemplary bird's-eye view video that is generated by the bird's-eye view video generation system according to the seventh embodiment. In the bird's-eye view video B, the side-surface front P1 of the vehicle 100, the surroundings of the wall X1, the side surface P2 of the vehicle 100, and the surroundings of the curb X2 are thus displayed more widely. Furthermore, in the bird's-eye view video B, the side-surface front P1 of the vehicle 100, the surroundings of the wall X1, the side surface P2 of the vehicle 100, and the surroundings of the curb X2 are positioned near the center line LF of the frame F.

Figure 20:
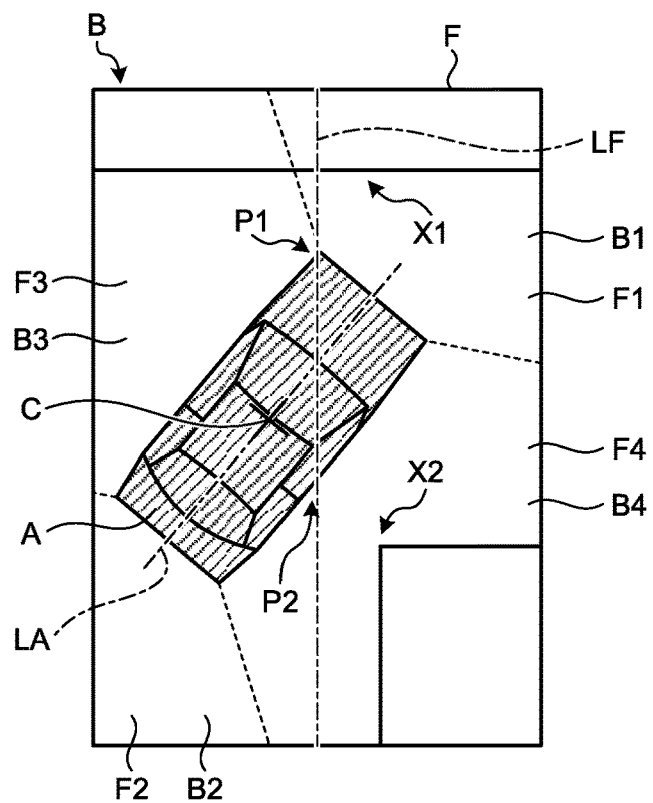
FIG. 20 is a diagram illustrating still another exemplary bird's-eye view video that is generated by the bird's-eye view video generation system according to the seventh embodiment.

Furthermore, as illustrated in FIG. 20, in the bird's-eye view video B, the center line LA of the virtual vehicle image A may have an inclination against the center line LF of the frame F and the side-surface front P1 may be positioned on the center line LF of the frame F. FIG. 20 is a diagram illustrating another exemplary bird's-eye view video that is generated by the bird's-eye view video generation system according to the seventh embodiment. In the bird's-eye view video B, the side-surface front P1 of the vehicle 100, the surroundings of the wall X1, the side surface P2 of the vehicle 100, and the surroundings of the curb X2 are thus displayed more widely. Furthermore, in the bird's-eye view video B, the side-surface front P1 of the vehicle 100, the surroundings of the wall X1, the side surface P2 of the vehicle 100, and the surroundings of the curb X2 are positioned near the center line LF of the frame F. In the process of generating the bird's-eye view video B in FIG. 20, the display controller 43b generates the bird's-eye view video B obtained by rotating the bird's-eye view video B, which is generated by the bird's-eye view video generator 43a, and furthermore moving the bird's-eye view video B in the direction opposite to the turning direction.

When move of the vehicle 100 in the turning direction completes, the display controller 43b generates the bird's-eye view video B in which the inclination of the virtual vehicle image A is canceled to recover the original state.

A case where, at step S22 in the flowchart represented in FIG. 15, the display controller 43b estimates move of the vehicle 100 in the turning direction based on the map information about the surroundings of the vehicle 100, which is acquired by the surroundings information acquisition unit 44, and the current location information about the vehicle 100, which is acquired by the vehicle information acquisition unit 42, will be described. For example, the display controller 43b determines that move of the vehicle 100 in the turning direction completes based on the map information about the surroundings of the vehicle 100 and the current location information about the vehicle 100 when the vehicle 100 is distant from an intersection where the vehicle 100 is supposed to turn right or left according to the route guide information by a given distance or larger. The given distance may be, for example, five meters.

A case where, at step S22 in the flowchart represented in FIG. 5, the display controller 43b estimates move of the vehicle 100 in the turning direction based on the map information about the surroundings of the vehicle 100, which is acquired by the surroundings information acquisition unit 44, the current location information about the vehicle 100, which is acquired by the vehicle information acquisition unit 42, and at least any one of the direction indicator operation information, the steering operation information and the angular velocity of the vehicle 100 that are acquired by the vehicle information acquisition unit 42 will be described. For example, the display controller 43b determines that move of the vehicle 100 in the turning direction completes based on the map information about the surroundings of the vehicle 100, the current location information about the vehicle 100, and at least any one of the direction indicator operation information, the steering operation information and the angular velocity of the vehicle 100 when the vehicle 100 is distant from an intersection where the vehicle 100 is supposed to turn right or left according to the route guide information by a given distance or larger and when the operation on the direction indicator is canceled, or when the steering wheel is operated in the recovering direction, or when the angular velocity changes to the recovering direction. The given distance may be, for example, five meters.

Alternatively, the display controller 43b may determine that move of the vehicle 100 in the turning direction completes according to any one of the methods described in the first embodiment.

In such a case, the display controller 43b determines that move of the vehicle 100 in the turning direction completes and generates the bird's-eye view video B with the virtual vehicle image A having recovered to the original state.

In the above-described manner, the bird's-eye view video generation system 1C generates the bird's-eye view video B and outputs video singles to the display panel 101 outside the bird's-eye view video generation system 1C. Based on the video signals which are output from the bird's-eye view video generation system 1C, the external display panel 101 displays the bird's-eye view video B, for example, together with a navigation.

As described above, the bird's-eye view video generation system 1C according to the seventh embodiment is able to generate the bird's-eye view video B that is inclined such that the side-surface front P1 of the virtual vehicle image A on the outer-wheel side in the turning direction is positioned on the upper side when information to note when moving the vehicle 100 in the turning direction is present around the vehicle 100 according to the surroundings information that is acquired by the surroundings information acquisition unit 44 and the vehicle information that is acquired by the vehicle information acquisition unit 42. More specifically, when the direction in which the vehicle 100 turns is the right direction, the bird's-eye view video B having a clockwise inclination against the frame F is displayed and the front left of the vehicle 100, the surroundings of the front left, the right side surface of the vehicle 100, and the surroundings of the right side surface can be displayed widely in the bird's-eye view video B. When the direction in which the vehicle 100 turns is the left direction, the bird's-eye view video B having a counterclockwise inclination against the frame F is displayed and the front right of the vehicle 100, the surroundings of the front right, and the left side surface of the vehicle 100 and the surroundings of the left side surface can be displayed widely in the bird's-eye view video B. Accordingly, the parts of the vehicle 100 that tend to make contact and the obstacle X can be displayed widely in the bird's-eye view video B. Thus, even with a rectangular display device, the bird's-eye view video generation system 1C is able to generate the bird's-eye view video B that makes it possible to properly check the surroundings of the vehicle 100, more specifically, information to note when moving the vehicle 100 in the turning direction.

The bird's-eye view video generation system 1C is able to generate the bird's-eye view video B in which the center line LA of the virtual vehicle image A has a clockwise inclination of 45 degrees against the center line LF of the frame F or the bird's-eye view video B in which the center line LA of the virtual vehicle image A is inclined against the center line LF of the frame F such that the side-surface front P1 is positioned on the center line LF of the frame F. Accordingly, in the bird's-eye view video B, the surroundings of the side-surface front P1 of the vehicle 100 and of the wall X1 and the surroundings of the side surface P2 and of the curb X2 can be displayed more widely. Furthermore, in the bird's-eye view video B, the surroundings of the side-surface front P1 of the vehicle 100 and of the wall X1 and the surroundings of the side surface P2 of the vehicle 100 and of the curb X2 can be positioned near the center line LF of the frame F. Accordingly, the bird's-eye view video generation system 1C is able to generate the bird's-eye view video B that makes it possible to properly check the surroundings of the vehicle 100, more specifically, information to note when moving the vehicle 100 in the turning direction.

Eighth Embodiment

Figure 21:
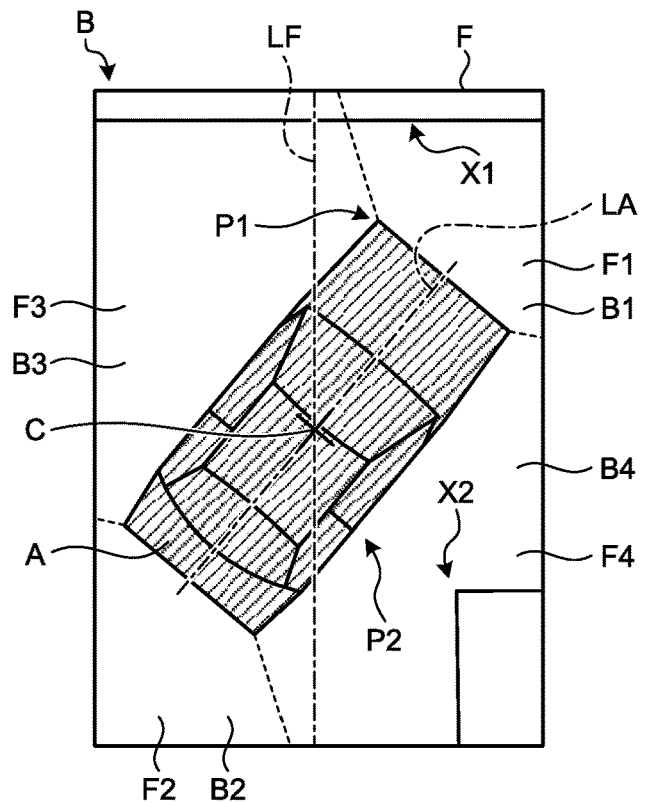
FIG. 21 is a diagram illustrating a bird's-eye view video that is generated by a bird's-eye view video generation system according to an eighth embodiment.

With reference to FIG. 21, the bird's-eye view video generation system 1C according to an eight embodiment will be described. FIG. 21 a diagram illustrating an exemplary bird's-eye view video that is generated by the bird's-eye view video generation system according to the eighth embodiment. A basic configuration of the bird's-eye view video generation system 1C is the same as that of the bird's-eye view video generation system 1C according to the seventh embodiment. In the following descriptions, the same components as those of the bird's-eye view video generation system 1C will be denoted with the same reference numbers or corresponding reference numbers and detailed descriptions of the components will be omitted. The bird's-eye view video generation system 1C of the eighth embodiment is different from the bird's-eye view video generation system 1C of the seventh embodiment in processes performed by the bird's-eye view video generation device 40.

At step S25 in the flowchart represented in FIG. 15, the display controller 43b enlarges the bird's-eye view video B when generating the bird's-eye view video B obtained by inclining the bird's-eye view video B, which is generated by the bird's-eye view video generator 43a In the eighth embodiment, the direction in which the vehicle 100 turns is the right direction and, as illustrated in FIG. 21, the center line LA of the virtual vehicle image A has an inclination against the centerline LF of the frame F in the bird's-eye view video B and the bird's-eye view video B is displayed in an enlarged manner compared to FIG. 17. Accordingly, the surroundings of the side-surface front P1 of the vehicle 100 and of the wall X1 and the wall and the surroundings of the side surface P2 of the vehicle 100 and of the curb X2 are displayed in an enlarged manner in the bird's-eye view video B.

As described above, the bird's-eye view video generation system 1C according to the eight embodiment generates the bird's-eye view video B obtained by enlarging the bird's-eye view video B that is generated by the bird's-eye view video generator 43a. Accordingly, the bird's-eye view video generation system 1C is able to display the surroundings of the side-surface front P1 of the vehicle 100 and of the wall X1 and the surroundings of the side surface P2 of the vehicle 100 and of the curb X2 in an enlarged manner. Thus, the bird's-eye view video generation system 1C is able to generate the bird's-eye view video B that makes it possible to more properly check the surroundings of the vehicle 100, more specifically, information to note when moving the vehicle 100 in the turning direction.

Ninth Embodiment

Figure 22:
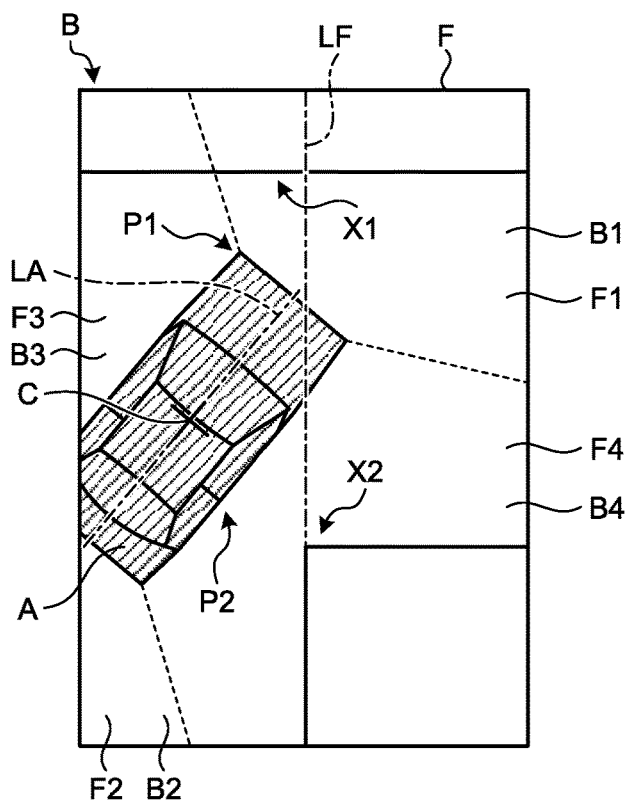
FIG. 22 is a diagram illustrating a bird's-eye view video that is generated by a bird's-eye view video generation system according to a ninth embodiment.

With reference to FIG. 22, the bird's-eye view video generation system 1C according to a ninth embodiment will be described. FIG. 22 is a diagram illustrating a bird's-eye view video that is generated by the bird's-eye view video generation system according to the ninth embodiment. The bird's-eye view video generation system 1C of the ninth embodiment is different from the bird's-eye view video generation system 1C of the first embodiment in processes performed by the bird's-eye view video generation device 40.

When generating the bird's-eye view video B obtained by inclining the bird's-eye view video B, which is generated by the bird's-eye view video generator 43a, at step S25, the display controller 43b generates the bird's-eye view video B moved to a side corresponding to a direction different from the direction in which the vehicle 100 turns. More specifically, when generating the bird's-eye view video B that is inclined such that the side-surface front P1 of the virtual vehicle image A on the outer-wheel side in the turning direction is positioned on the upper side of the frame F, the display controller 43b generates the bird's-eye view video B obtained by shifting the bird's-eye view video B in a direction different from the direction in which the vehicle 100 turns. In this case, the center C of the virtual vehicle image A is in a position to which the center C moves from the center line LF of the frame F in a direction different from the turning direction. When the vehicle 100 turns right, the display controller 43b generates the bird's-eye view video B obtained by shifting the bird's-eye view video B, which is generated by the bird's-eye view video generator 43a, in the left direction. When the vehicle 100 turns left, the display controller 43b generates the bird's-eye view video B obtained by shifting the bird's-eye view video B, which is generated by the bird's-eye view video generator 43a, in the right direction.

In the ninth embodiment, the direction in which the vehicle 100 turns is the right direction and, as illustrated in FIG. 22, the bird's-eye view video B is displayed such that the center C of the virtual vehicle image A is on the left with respect to the center line LF of the frame F. Accordingly, the surroundings of the side-surface front P1 and of the wall X1 that is the obstacle X and the surroundings of the side surface P2 and of the curb X2 are displayed more widely. Furthermore, in the bird's-eye view video B, the surroundings of the side-surface front P1 and of the wall X1 that is the obstacle X and the surroundings of the side surface P2 and of the curb X2 are positioned near the center line LF of the frame F.

As described above, when generating the bird's-eye view video B obtained by inclining the bird's-eye view video B, which is generated by the bird's-eye view video generator 43a, the bird's-eye view video generation system 1C according to the ninth embodiment generates the bird's-eye view video B that is moved to the side corresponding to the direction different from the direction in which the vehicle 100 turns. The bird's-eye view video generation system 1C thus is able to display the parts of the vehicle 100 that tend to make contact and the obstacle X more widely. Furthermore, the bird's-eye view video generation system 1C is able to position the parts of the vehicle 100 that tend to make contact and the obstacle X in the bird's-eye view video B near the center line LF of the frame F. As described above, the bird's-eye view video generation system 1C is able to generate the bird's-eye view video B that makes it possible to properly check the surroundings of the vehicle 100, more specifically, information to note when moving the vehicle 100 in the turning direction.

Tenth Embodiment

Figure 23:
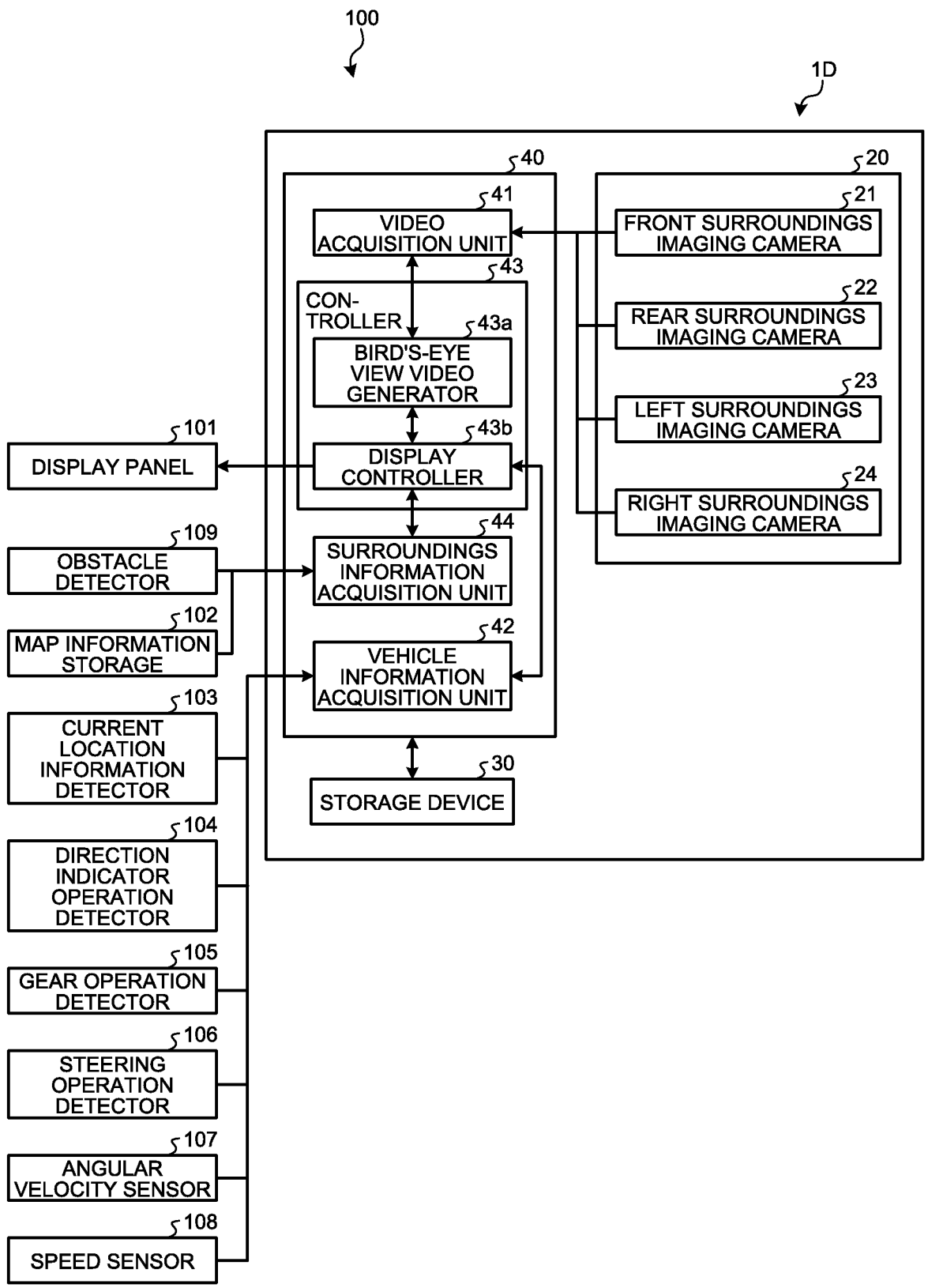
FIG. 23 is a block diagram illustrating an exemplary configuration of a bird's-eye view video generation system according to a tenth embodiment.
Figure 24:
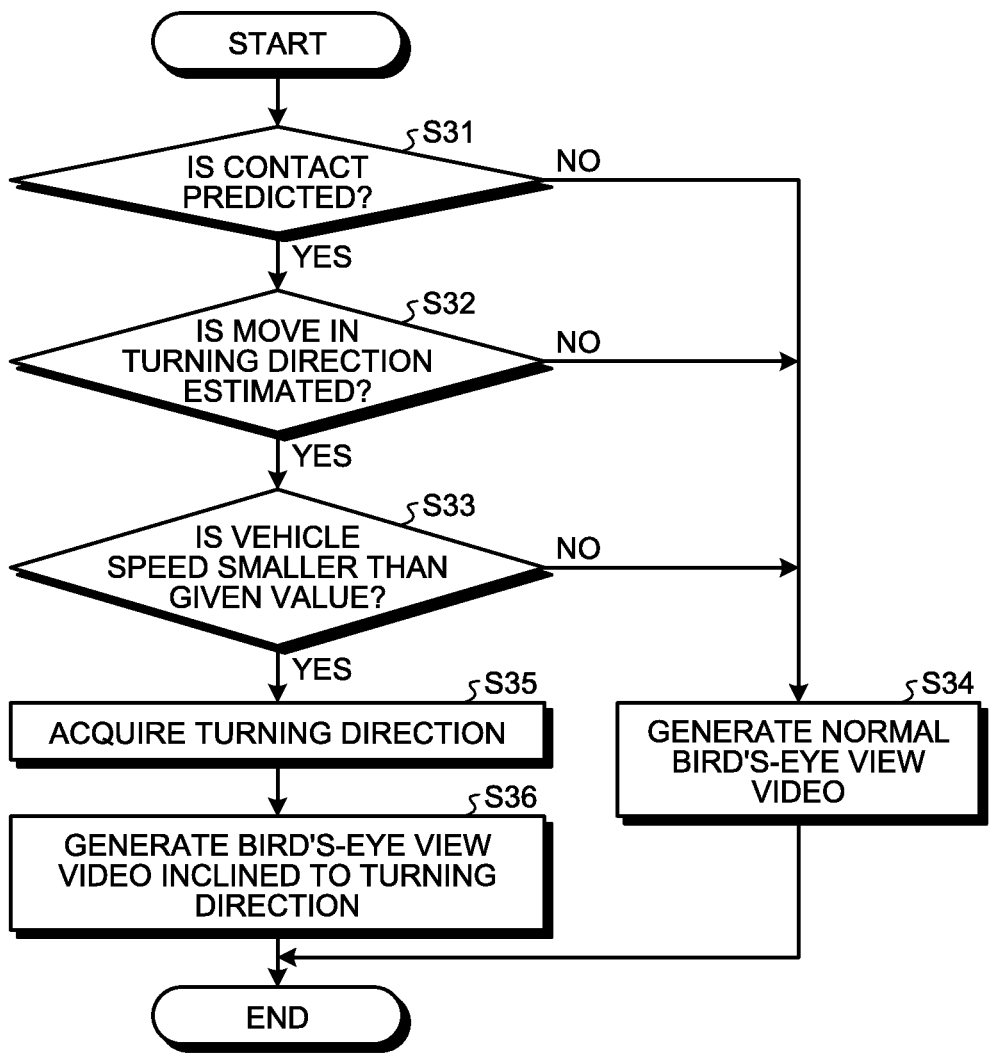
FIG. 24 is a flowchart representing a flow of processes performed by a bird's-eye view video generation device of the bird's-eye view video generation system according to the tenth embodiment.

With reference to FIGS. 23 and 24, a bird's-eye view video generation system 1D according to a tenth embodiment will be described. FIG. 23 is a block diagram illustrating an exemplary configuration of the bird's-eye view video generation system according to the tenth embodiment. The bird's-eye view video generation system 1D of the tenth embodiment is different from the bird's-eye view video generation system 1C of the seventh embodiment in that the vehicle information acquisition unit 42 further acquires a vehicle speed from a speed sensor (vehicle speed acquisition unit) 108.

The vehicle information acquisition unit 42 further acquires a vehicle speed that is output by the speed sensor 108. The vehicle information acquisition unit 42 outputs the vehicle information containing the acquired vehicle speed to the display controller 43b.

When information to note when moving the vehicle 100 in the turning direction is present around the vehicle 100 and, furthermore, when the vehicle speed is smaller than a given value according to the vehicle speed that is acquired by the speed sensor 108, the display controller 43b generates the bird's-eye view video B that is inclined such that the side-surface front P1 of the virtual vehicle image A on the outer-wheel side in the turning direction is positioned on the upper side. The given value may be, for example, a speed corresponding to 10 km/h or slow driving. This is to support the driver in driving when it is predicted that the driver reduces the speed to a speed lower than the given value and is driving more carefully.

With reference to FIG. 24, a flow of processes performed by the display controller 43b will be described more in detail. FIG. 24 is a flowchart representing a flow of processes performed by the bird's-eye view video generation device of the bird's-eye view video generation system according to the tenth embodiment.

The display controller 43b determines whether contact is predicted (step S31). Step S31 is the same process as step S21.

The display controller 43b determines whether move in the turning direction is estimated (step S32). Step S32 is the same process as step S22.

The display controller 43b determines whether the vehicle speed is smaller than the given value (step S33). When it is not determined that the vehicle speed is smaller than the given value (NO at step S33), the display controller 43b proceeds to step S34. When it is determined that the vehicle speed is smaller than the given value (YES at step S33), the display controller 43b proceeds to step S35.

The display controller 43b generates the bird's-eye view video B in which the virtual vehicle image A is arranged straightly (step S34). Step S34 is the same process as step S23.

The display controller 43b acquires the direction in which the vehicle 100 turns (step S35). Step S35 is the same process as step S24.

The display controller 43b generates the normal bird's-eye view video B with the inclined virtual vehicle image A (step S36). Step S36 is the same process as step S25.

In the tenth embodiment, when information to note when moving the vehicle 100 in the turning direction is present around the vehicle 100 and, furthermore, when the vehicle speed is smaller than the given value, the bird's-eye view video B obtained by inclining the bird's-eye view video B, which is generated by the bird's-eye view video generator 43a, is generated.

As described above, when information to note when moving the vehicle 100 in the turning direction is present around the vehicle 100 and, furthermore, when the vehicle speed is smaller than the given value, the bird's-eye view video generation system 1D according to the tenth embodiment generates the bird's-eye view video B that is inclined such that the side-surface front P1 of the virtual vehicle image A on the outer-wheel side in the turning direction is positioned on the upper side. When it is predicted that the driver reduces the speed to a speed lower than the given value and is driving more carefully, the bird's-eye view video generation system 1D is able to support the driver in driving. As described above, the bird's-eye view video generation system 1D is able to generate the bird's-eye view video B that makes it possible to properly check the surroundings of the vehicle 100, more specifically, information to note when moving the vehicle 100 in the turning direction and provide drive support properly according to the driving situation.

The bird's-eye view video generation system 1 according to the present invention has been described; however, the present invention may be carried out in various different modes in addition to the above-described embodiments.

The components of the bird's-eye view video generation system 1 illustrated in the drawings are functional ideas and need not necessarily be configured physically as illustrated in the drawings. In other words, the specific mode of each device is not limited to that illustrated in the drawings. All or part of the devices may be distributed or integrated functionally or physically according to any unit and according to processing load on each device or situation in which the device is used.

The controller 43 has been described as one in which the bird's-eye view video generator 43a converts the virtual vehicle image A of the vehicle 100 viewed from above and the videos that are acquired by the video acquisition unit 41 into a video of the vehicle 100 viewed from above and outputs the video as the bird's-eye view video B and the display controller 43b processes the video that is generated by the bird's-eye view video generator 43a into a video having the virtual vehicle image A and the surroundings of the virtual vehicle image A that are extracted from the video B and transmits the processed video to the display panel 101; however, the controller 43 is not limited to this configuration. For example, the display controller may determine how the virtual vehicle video A and the video of the surroundings of the virtual vehicle video A are arranged in the frame F and, under the control of the controller, the bird's-eye view video generator may convert the virtual vehicle video A and the videos that are obtained by the video acquisition unit 41 into a video of the vehicle 100 viewed from above based on the arrangement of the virtual vehicle video A and the videos of the surroundings of the virtual vehicle video A and output the video as the bird's-eye view video B to the display controller and furthermore the display controller may transmit the bird's-eye view video B to the display panel 101.

Figure 25:
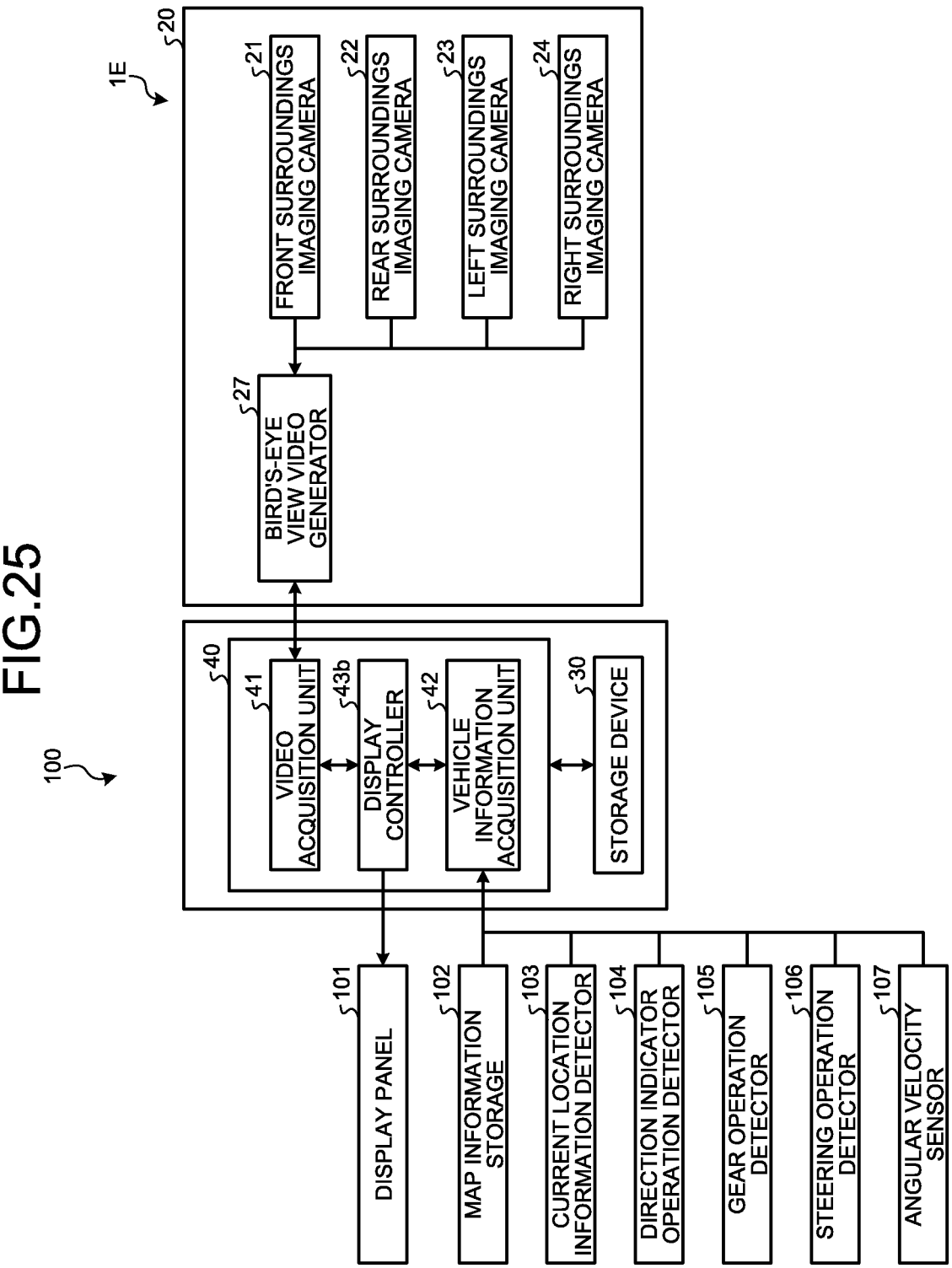
FIG. 25 is a block diagram illustrating another exemplary configuration of the bird's-eye view video generation system.

As illustrated in FIG. 25, a bird's-eye view video generator 27 of a bird's-eye view video generation system 1E may serve as a function of the first imaging device 20. FIG. 25 is a block diagram illustrating another exemplary configuration of the bird's-eye view video generation system. In this case, the video acquisition unit 41 of the bird's-eye view video generation device 40 acquires the bird's-eye view video B that is generated by the bird's-eye view video generator 27 of the first imaging device 20. The display controller 43b processes the bird's-eye view video B, which is generated by the bird's-eye view video generator 27 of the first imaging device 20, into a video having the virtual vehicle image A and the surroundings of the virtual vehicle image A that are extracted and transmits the processed video to the display panel 101. As described above, in the bird's-eye view video generation system 1E, the bird's-eye view video generator 27 of the first imaging device 20 and the display controller 43b of the bird's-eye view video generation device 40 implements a function serving as a controller.

Figure 26:
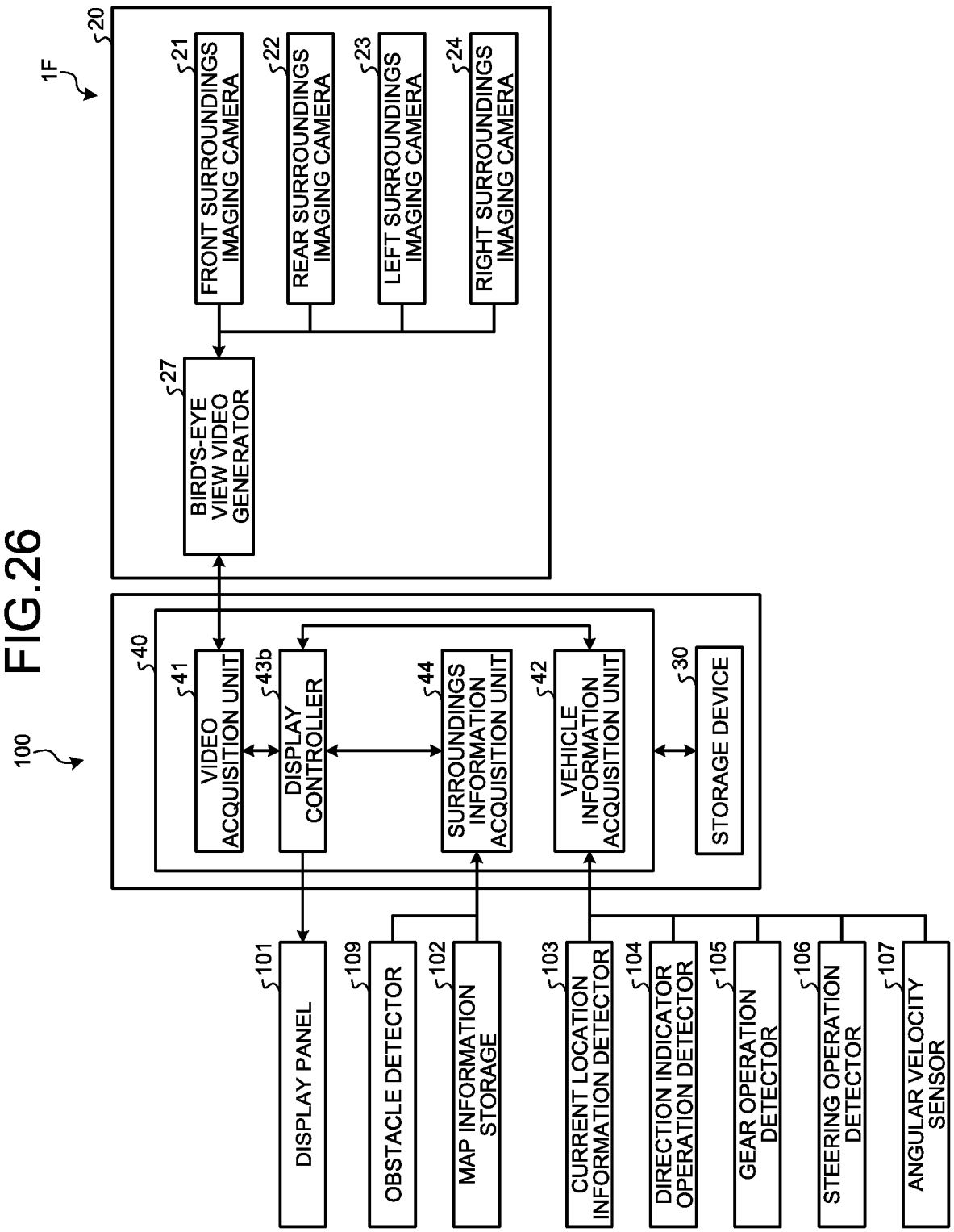
FIG. 26 is a block diagram illustrating another exemplary configuration of the bird's-eye view video generation system.

As illustrated in FIG. 26, the bird's-eye view video generator 27 of a bird's-eye view video generation system 1F may serve as a function of the first imaging device 20. FIG. 26 is a block diagram illustrating another exemplary configuration of the bird's-eye view video generation system. In this case, the video acquisition unit 41 of the bird's-eye view video generation device 40 acquires the bird's-eye view video B that is generated by the bird's-eye view video generator 27 of the first imaging device 20. The display controller 43b processes the bird's-eye view video B, which is generated by the bird's-eye view video generator 27 of the first imaging device 20, into a video having the virtual vehicle image A and the surroundings of the virtual vehicle image A that are extracted from the video B and transmits the processed video to the display panel 101. As described above, in the bird's-eye view video generation system 1F, the bird's-eye view video generator 27 of the first imaging device 20 and the display controller 43b of the bird's-eye view video generation device 40 implements a function serving as a controller.

The configuration of the bird's-eye view video generation system 1 is, for example, implemented by a program that is loaded as software into a memory. In the embodiment, the configuration has been described as functional blocks implemented by association among sets of hardware or software. In other words, the functional blocks may be implemented by only hardware or only software or in various forms, such as a combination of hardware and software.

The above-described components include those easily achieved by those skilled in the art and those substantially the same as the above-described components. Furthermore, the above-described components may be combined as appropriate. Furthermore, it is possible to make various types of omission, replacement or change among the components within the scope of the invention.

Figure 27:
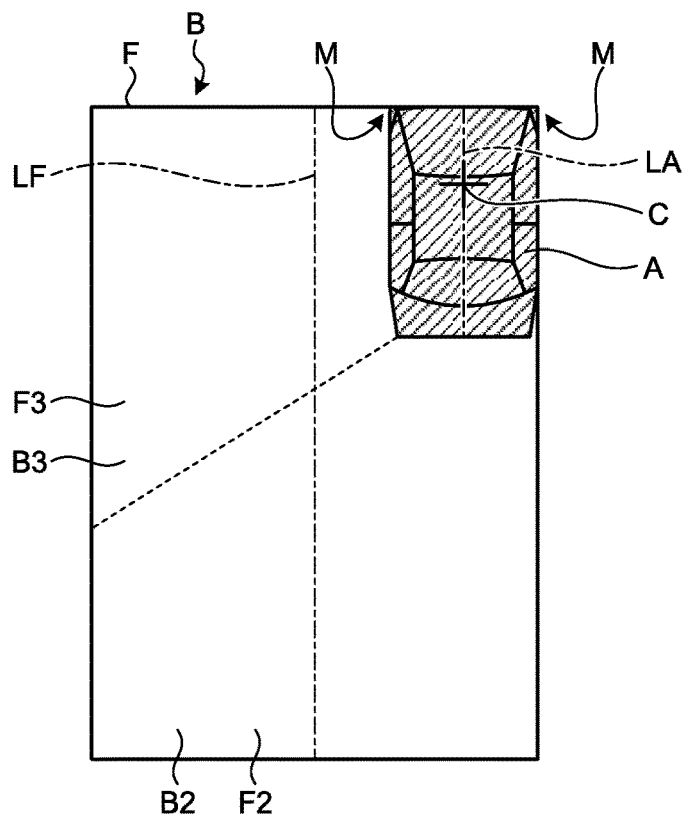
FIG. 27 is a diagram illustrating another exemplary bird's-eye view video that is generated by the bird's-eye view video generation system.

For example, the bird's-eye view video B illustrated in FIG. 27 is one obtained by combining the second embodiment and the fourth embodiment. FIG. 27 is a diagram illustrating another exemplary bird's-eye view video that is generated by the bird's-eye view video generation system. At step S14 in the flowchart represented in FIG. 2, the display controller 43b may generate the bird's-eye view video B illustrated in FIG. 27. In this case, in the bird's-eye view video B, the virtual vehicle image A is positioned at the upper right of the frame F and the rear of the side mirrors of the vehicle 100 is positioned to be within the frame F and furthermore the virtual vehicle image A is moved to and displayed at the upper right end of the frame F. Accordingly, the left side corresponding to the direction in which the vehicle 100 moves and the rear are displayed more widely. The frame F contains the second frame F2 and the third frame F3 more widely and does not contain the first fame F1 and the fourth frame F4. Thus, the bird's-eye view video generation system 1 is able to generate the bird's-eye view video B with which the surroundings of the vehicle are checked easily according to the move of the vehicle 100 in the turning direction.

Figure 28:
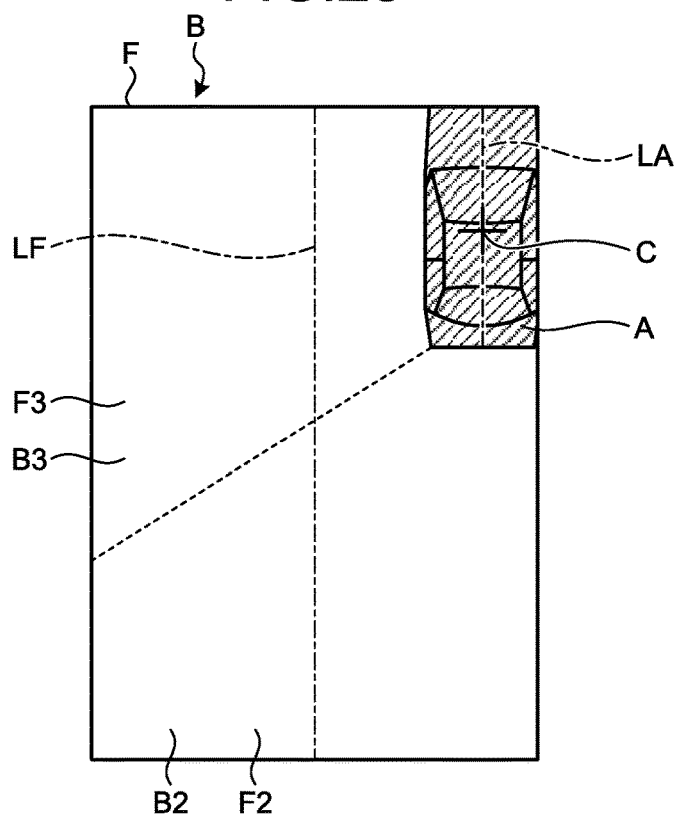
FIG. 28 is a diagram illustrating still another exemplary bird's-eye view video that is generated by the bird's-eye view video generation system.

For example, the bird's-eye view video B illustrated in FIG. 28 is one obtained by combining the third embodiment and the fourth embodiment. FIG. 28 is a diagram illustrating another exemplary bird's-eye view video that is generated by the bird's-eye view video generation system. At step S14 in the flowchart represented in FIG. 2, the display controller 43b may generate the bird's-eye view video B illustrated in FIG. 28. In this case, in the bird's-eye view video B, the virtual vehicle image A is displayed smaller than in FIG. 3 and the virtual vehicle image A is moved to and displayed at the upper right end of the frame F. Accordingly, the left side corresponding to the direction in which the vehicle 100 moves and the rear are displayed more widely. The frame F contains the second frame F2 and the third frame F3 more widely and does not contain the first fame F1 and the fourth frame F4. Thus, the bird's-eye view video generation system 1 is able to generate the bird's-eye view video B with which the surroundings of the vehicle are checked easily according to the move of the vehicle 100 in the turning direction.

Figure 29:
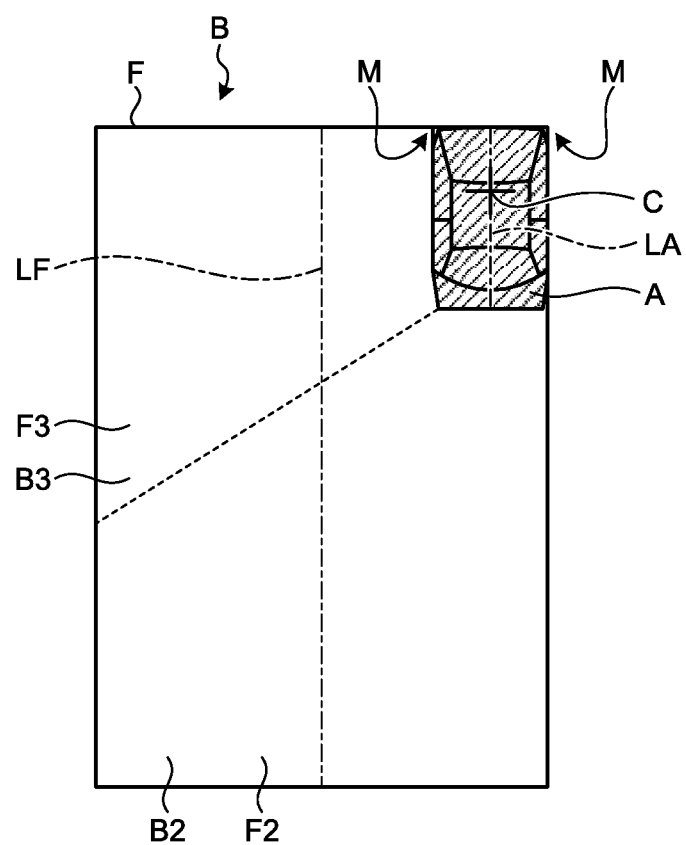
FIG. 29 is a diagram illustrating still another exemplary bird's-eye view video that is generated by the bird's-eye view video generation system.

For example, the bird's-eye view video B illustrated in FIG. 29 is one obtained by combining the second embodiment, the third embodiment and the fourth embodiment. FIG. 29 is a diagram illustrating another exemplary bird's-eye view video that is generated by the bird's-eye view video generation system. At step S14 in the flowchart represented in FIG. 2, the display controller 43b may generate the bird's-eye view video B illustrated in FIG. 29. In this case, in the bird's-eye view video B, the virtual vehicle image A is positioned at the upper right of the frame F and the rear of the side mirrors M of the vehicle 100 is positioned to be within the frame F, the virtual vehicle image A is displayed smaller than in FIG. 3, and the virtual vehicle image A is moved to and displayed at the upper right end of the frame F. Accordingly, the left side corresponding to the direction in which the vehicle 100 moves and the rear is displayed more widely. The frame F contains the second frame F2 and the third frame F3 more widely and does not contain the first fame F1 and the fourth frame F4. Thus, the bird's-eye view video generation system 1 is able to generate the bird's-eye view video B with which the surroundings of the vehicle are checked easily according to the move of the vehicle 100 in the turning direction.

The display controller 43b may perform control to change the orientation and angle of view of the front surroundings imaging camera 21, the rear surroundings imaging camera 22, the left surroundings imaging camera 23 and the right surroundings imaging camera 24 of the first imaging device 20 and the left-rear surroundings imaging camera 51 and the right-rear surroundings imaging camera 52 of the second imaging device 50 to generate the bird's-eye view video B that is desired at step S14 in the flowchart represented in FIG. 2. Alternatively, the display controller 43b may perform control to change the orientation and angle of view of the front surroundings imaging camera 21, the rear surroundings imaging camera 22, the left surroundings imaging camera 23 and the right surroundings imaging camera 24 of the first imaging device 20 to generate the bird's-eye view video B that is desired at step S25 in the flowchart represented in FIG. 15. For example, the display controller 43b may change the orientation of the camera to capture a video in the direction in which the vehicle 100 moves and increase the angle of view. Thus, the bird's-eye view video generation system 1 is able to generate the bird's-eye view video B with which the surroundings of the vehicle are checked easily according to the move of the vehicle 100 in the turning direction.

According to the flowchart illustrated in FIG. 2, the display controller 43b generates the bird's-eye view video B with the shifted virtual vehicle image A when it is estimated that the vehicle 100 will move in the turning direction. Alternatively, at step S14, the display controller 43b may gradually shift the virtual vehicle image A in the frame F according to a given condition. For example, the display controller 43b may gradually shift the virtual vehicle image A within the frame F according to the acceleration of the vehicle 100. Accordingly, in the bird's-eye view video B, the position of the virtual vehicle image A within the frame F changes gradually. This enables the driver to check the surroundings of the vehicle more easily.

In the flow of processes performed by the bird's-eye view video generation device 40 of the bird's-eye view video generation system 1, which is represented in FIG. 15, step S22 is executed after step S21 is executed. Alternatively, step S21 and step S22 may be performed in the opposite order. More specifically, the display controller 43b may determine whether contact is predicted after determining whether move in the turning direction is estimated. In the flow of processes performed by the bird's-eye view video generation device 40 of the bird's-eye view video generation system 1D, which is represented in FIG. 24, step S32 is executed after step S31 is executed and step S33 is executed after step S32 is executed. Alternatively, step S31, step S32 and step S33 may be executed in a different order. More specifically, for example, the display controller 43b may determine whether contact is predicted after determining whether move in the turning direction is estimated and then determine whether the vehicle speed is smaller than the given value.

The above-described embodiments has been described as an example in which, as illustrated in FIG. 16, the obstacle X is present at the side-surface front P1 on the outer-wheel side in the turning direction and the side surface P2 of the vehicle 100 on the inner-wheel side in the turning direction; however, the position of the obstacle X is not limited to them.

Figure 30:
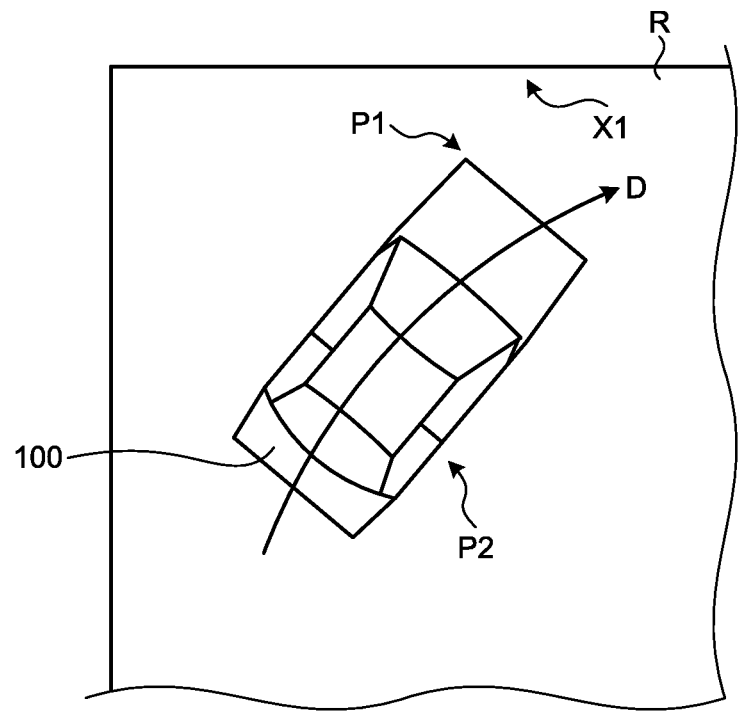
FIG. 30 is a schematic diagram illustrating other circumstances around the vehicle that uses the bird's-eye view video generation system.
Figure 31:
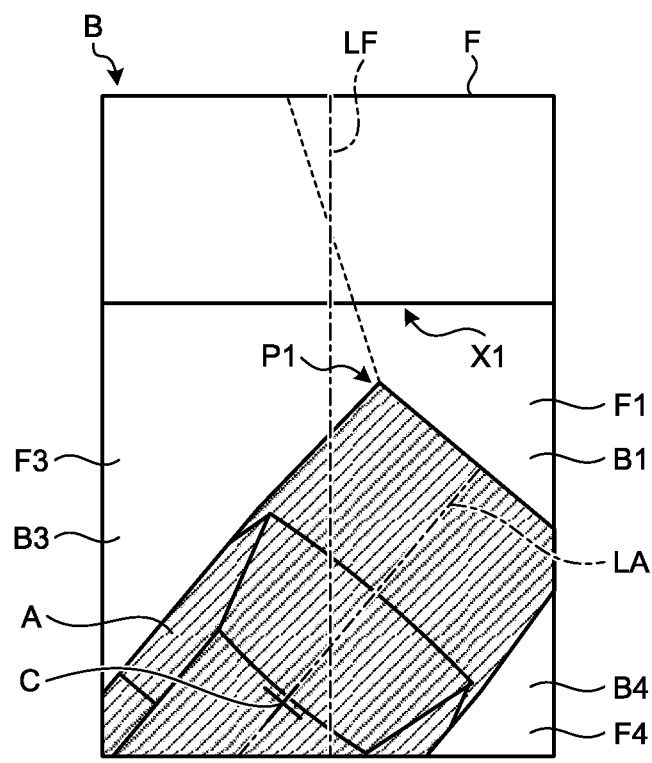
FIG. 31 is a diagram illustrating another exemplary bird's-eye view video that is generated by the bird's-eye view video generation system.

FIG. 30 will be used to give descriptions. FIG. 30 is a schematic diagram illustrating other circumstances around the vehicle that uses the bird's-eye view video generation system. FIG. 31 is a diagram illustrating another exemplary bird's-eye view video that is generated by the bird's-eye view video generation system. According to FIG. 30, the vehicle 100 is turning right. In this case, the width of the road in the turning direction is larger than the given value; however, there is a risk that the wall X1 may contact the side-surface front P1. The display controller 43b thus determines that contact is predicated. In this case, as illustrated in FIG. 31, the bird's-eye view video B is enlarged and the bird's-eye view video B is shifted to and displayed on the lower side of the frame F as a direction different from the direction in which the vehicle 100 turns. Accordingly, the side-surface front P1 of the vehicle 100 is enlarged and displayed in the bird's-eye view video B.

Figure 32:
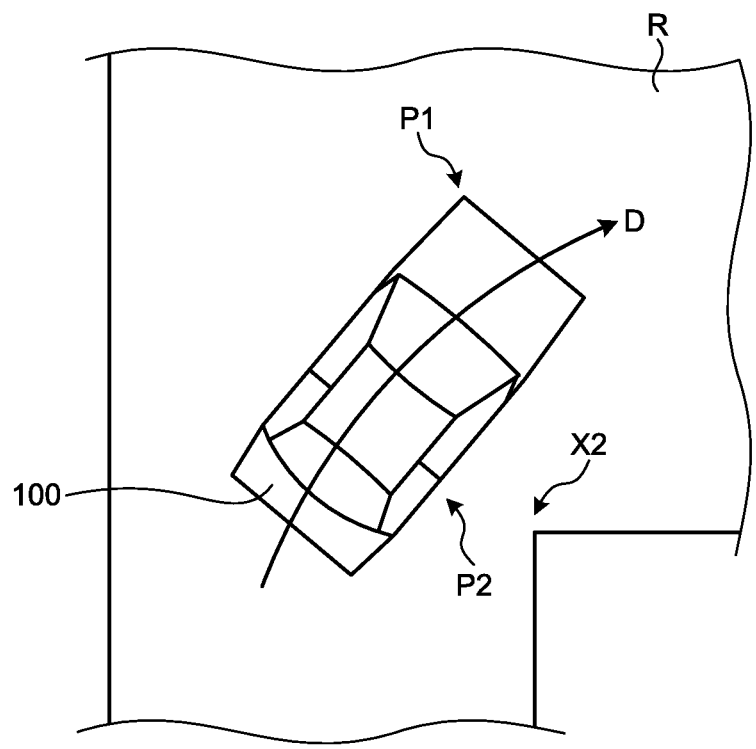
FIG. 32 is a schematic diagram illustrating still other circumstances around the vehicle that uses the bird's-eye view video generation system.
Figure 33:
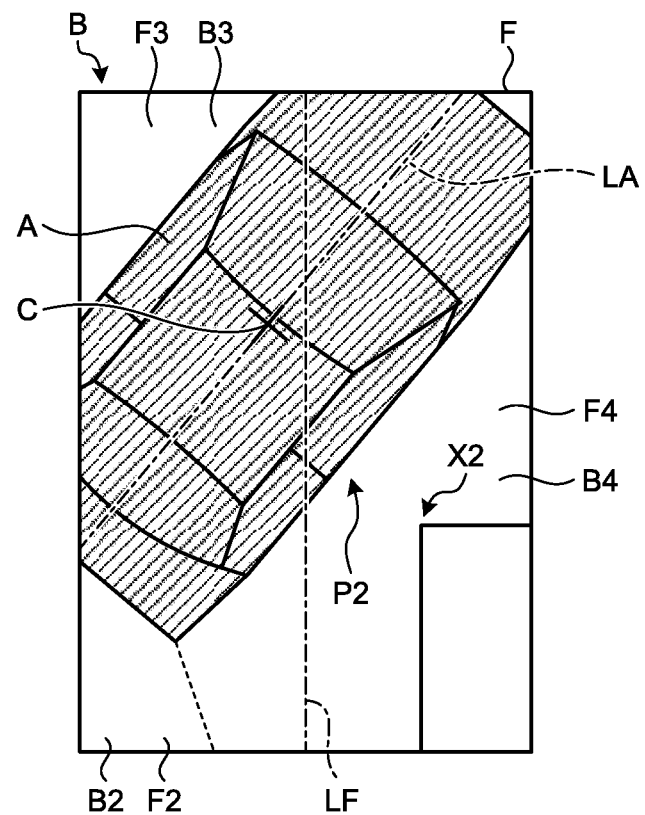
FIG. 33 is a diagram illustrating still another exemplary bird's-eye view video that is generated by the bird's-eye view video generation system.

FIG. 32 will be used to give descriptions. FIG. 32 is a schematic diagram illustrating other circumstances around the vehicle that uses the bird's-eye view video generation system. FIG. 33 is a diagram illustrating another exemplary bird's-eye view video that is generated by the bird's-eye view video generation system. According to FIG. 32, the vehicle 100 is turning right. In this case, the width of the road in the turning direction is larger than the given value; however, the curb X2 is present in a position to turn right and there is a risk that the curb X2 may contact the side surface P2. For this reason, the display controller 43b determines that contact is predicted. In this case, as illustrated in FIG. 32, the bird's-eye view video B is enlarged and the bird's-eye view video B is shifted to and displayed on the upper side of the frame F as a direction different from the direction in which the vehicle 100 turns. Accordingly, the side surface P2 of the vehicle 100 is enlarged and displayed in the bird's-eye view video B.

The display controller 43b may generate the bird's-eye view video B in which the obstacle X and the parts of the vehicle 100 for which contact is predicted are highlighted with a different color. For example, as for FIG. 17, the bird's-eye view video B in which the surroundings of the side-surface front P1 of the vehicle 100 and of the wall X1 that is the obstacle X and the surroundings of the side surface P2 of the vehicle 100 and of the curb X2 have a different color may be generated.

The obstacle detector 109 has been described as a sensor that detects the obstacle X around the vehicle 100; however, the obstacle detector 109 is not limited thereto. For example, the obstacle detector 109 may perform image processing on the surroundings videos that are output from the first imaging device to detect the obstacles X around the vehicle 100.

According to the flowchart represented in FIG. 15, when it is estimated that the vehicle 100 will move in the turning direction, the display controller 43b generates the bird's-eye view video B obtained by inclining the bird's-eye view video B, which is generated by the bird's-eye view video generator 43a. Alternatively, at step S25, the bird's-eye view video B may be inclined gradually according to a given condition. For example, the display controller 43b may gradually incline the bird's-eye view video B in the frame F according to the map information about the surroundings of the vehicle 100, the current location information about the vehicle 100, the steering operation information and the angular velocity of the vehicle 100. The display controller 43b may gradually cause the bird's-eye view video B in the frame F to recover to the original according to the map information about the surroundings of the vehicle 100, the current location information about the vehicle 100, the steering operation information and the angular velocity of the vehicle 100. Accordingly, in the bird's-eye view video B that is displayed on the external display panel 101, the inclination of the bird's-eye view video B in the frame F gradually changes. Thus, the bird's-eye view video generation system 1 is able to generate the bird's-eye view video B that makes it possible to properly check the surroundings of the vehicle 100, more specifically, information to note when moving the vehicle 100 in the turning direction.

The present invention realizes an effect that it is possible to check surroundings of a vehicle properly.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:
1. A bird's-eye view video generation device comprising:
   a video acquisition unit configured to acquire surroundings videos obtained by capturing videos of surroundings of a vehicle;

a vehicle information acquisition unit configured to acquire a speed of the vehicle and vehicle information to estimate move of the vehicle in a turning direction; and a controller configured to generate, based on the surroundings videos acquired by the video acquisition unit, a bird's-eye view video of the vehicle looked down from above, the bird's-eye view video containing a virtual vehicle image representing the vehicle, wherein the controller is configured to, when move of the vehicle in the turning direction is estimated based on the vehicle information that is acquired by the vehicle information acquisition unit, generate a bird's-eye view video in which the vehicle is moved to and positioned on a side opposite to a direction in which the vehicle moves in the turning direction with a surroundings video in a direction in which the vehicle moves being widely displayed in a different direction in a situation where the vehicle is decelerating and a situation where the vehicle is accelerating.

2. The bird's-eye view video generation device according to claim 1, wherein the vehicle information acquisition unit is configured to acquire a vehicle speed of the vehicle, and the controller is configured to generate, based on the vehicle speed that is acquired by the vehicle information acquisition unit, the bird's-eye view video that has a wider area in the direction in which the vehicle moves in a situation where the vehicle is decelerating than that in a situation where the vehicle is accelerating.

3. The bird's-eye view video generation device according to claim 1, wherein the vehicle information acquisition unit is configured to acquire a vehicle speed of the vehicle, and the controller is configured to generate, based on the vehicle speed that is acquired by the vehicle information acquisition unit, the bird's-eye view video that has a wider area in a direction opposite to the direction in which the vehicle moves in the turning direction in a situation where the vehicle is accelerating than that in a situation where the vehicle is decelerating.

4. The bird's-eye view video generation device according to claim 1, wherein the controller is configured to generate the bird's-eye view video with the virtual vehicle image moved and positioned to the side opposite to the direction in which the vehicle moves in the turning direction and with the virtual vehicle image reduced.

5. The bird's-eye view video generation device according to claim 1, wherein the controller is configured to generate the bird's-eye view video of the rear with respect to side mirrors of the vehicle in which the virtual vehicle image is moved and positioned on the side opposite to the direction in which the vehicle moves in the turning direction.

6. A bird's-eye view video generation system, comprising: the bird's-eye view video generation device according to claim 1; and at least either an imaging unit configured to capture surroundings videos obtained by capturing videos of surroundings of the vehicle and supply the surroundings videos to the video acquisition unit or a display controller and a display panel that display a bird's-eye view video that is generated by the controller.

7. A bird's-eye view video generation method comprising steps of:

(a) acquiring surroundings videos obtained by capturing videos of surroundings of a vehicle;

(b) acquiring a speed of the vehicle and vehicle information to estimate move of the vehicle in a turning direction; and (c) controlling to generate, based on the surroundings videos acquired at the step (a), a bird's-eye view video of the vehicle looked down from above, the bird's-eye view video containing a virtual vehicle image representing the vehicle, wherein the step (c) includes generating, when move of the vehicle in the turning direction is estimated based on the vehicle information that is acquired at the step (b), a bird's-eye view video in which the vehicle is moved to and positioned on a side opposite to a direction in which the vehicle moves in the turning direction with a surroundings video in a direction in which the vehicle moves being widely displayed in a different direction in a situation where the vehicle is decelerating and a situation where the vehicle is accelerating.

8. A non-transitory storage medium storing therein a program for causing a computer to execute, as a bird's-eye view video generation device, a process comprising steps of:

(a) acquiring surroundings videos obtained by capturing videos of surroundings of a vehicle;

(b) acquiring a speed of the vehicle and vehicle information to estimate move of the vehicle in a turning direction; and (c) controlling to generate, based on the surroundings videos acquired at the step (a), a bird's-eye view video of the vehicle looked down from above, the bird's-eye view video containing a virtual vehicle image representing the vehicle, wherein the step (c) includes generating, when move of the vehicle in the turning direction is estimated based on the vehicle information that is acquired at the step (b), a bird's-eye view video in which the vehicle is moved to and positioned on a side opposite to a direction in which the vehicle moves in the turning direction with a surroundings video in a direction in which the vehicle moves being widely displayed in a different direction in a situation where the vehicle is decelerating and a situation where the vehicle is accelerating.

* * * * *